United States Patent
Kim

(10) Patent No.: US 7,486,406 B2
(45) Date of Patent: Feb. 3, 2009

(54) VARIABLE TOMOGRAPHIC SCANNING WITH WAVELENGTH SCANNING DIGITAL INTERFACE HOLOGRAPHY

(75) Inventor: Myung K. Kim, Tampa, FL (US)

(73) Assignee: University of South Florida, Tampa, FL (US)

( * ) Notice: Subject to any disclaimer, the term of this patent is extended or adjusted under 35 U.S.C. 154(b) by 8 days.

(21) Appl. No.: 11/967,661

(22) Filed: Dec. 31, 2007

(65) Prior Publication Data
US 2008/0137933 A1 Jun. 12, 2008

Related U.S. Application Data

(63) Continuation of application No. PCT/US2006/025610, filed on Jun. 29, 2006.

(60) Provisional application No. 60/694,856, filed on Jun. 29, 2005.

(51) Int. Cl.
*G01B 11/02* (2006.01)
*G01B 9/021* (2006.01)

(52) U.S. Cl. ........................ 356/497; 356/457

(58) Field of Classification Search .......... 356/457, 356/458, 479, 497
See application file for complete search history.

(56) References Cited

U.S. PATENT DOCUMENTS

| | | | |
|---|---|---|---|
| 3,585,848 A * | 6/1971 | Korpel | ........................ 73/604 |
| 6,057,920 A | 5/2000 | Fercher et al. | |
| 6,853,457 B2 | 2/2005 | Bjarklev et al. | |
| 6,885,460 B2 * | 4/2005 | Morita | ........................ 356/514 |
| 7,289,253 B2 * | 10/2007 | Thomas | ........................ 359/11 |
| 2004/0212807 A1 | 10/2004 | Hanson et al. | |
| 2004/0213462 A1 | 10/2004 | Hanson et al. | |
| 2005/0057787 A1* | 3/2005 | Nakamura | ........................ 359/3 |

OTHER PUBLICATIONS

Yu, L.; Kim, M.K. 2006. Variable tomographic scanning with wavelength scanning digital interference holography. Optics Communications. 260: 462-468.

Yu, L.; Kim, M.K. 2006. Pixel resolution control in numerical reconstruction of digital holography. Optics Letters. 31: 897-899.

* cited by examiner

*Primary Examiner*—Michael A Lyons
(74) *Attorney, Agent, or Firm*—Michael M. McGaw; Smith & Hopen, P.A.

(57) ABSTRACT

A series of holograms is recorded by synchronizing a camera with laser pulses under the control of a digital delay generator. Amplitude and phase images are calculated while image distances are adjusted for the best focus on the object under observation. The amplitude and phase images are reconstructed while adjusting the image distances over a predetermined range to maintain the object in focus. Numerical superposition of a plurality of holographic fields taken with varying wavelengths provides high resolution microscopic three-dimensional imaging. Numerical reconstruction is based on an angular spectrum method that enables calculation of the image at any distance from the hologram plane. Wavelength scanning digital interference holography also enables image reconstruction along an arbitrarily tilted plane.

8 Claims, 28 Drawing Sheets

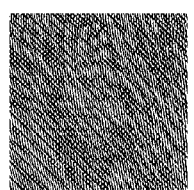 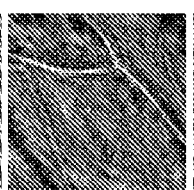 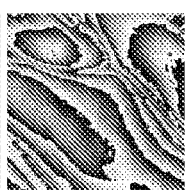 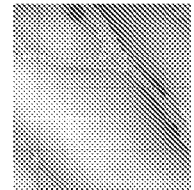
Fig. 1A    Fig. 1B    Fig. 1C    Fig. 1D
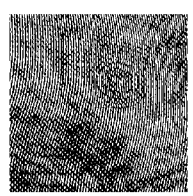  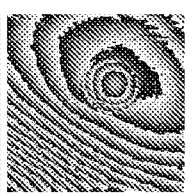 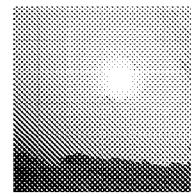
Fig. 1E    Fig. 1F    Fig. 1G    Fig. 1H
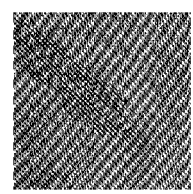 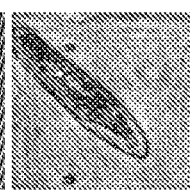 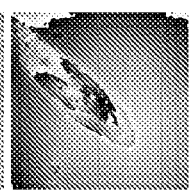 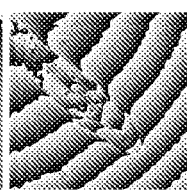
Fig. 2A    Fig. 2B    Fig. 2C    Fig. 2D
 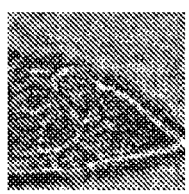   
Fig. 3A    Fig. 3B    Fig. 3C    Fig. 3D    Fig. 3E
  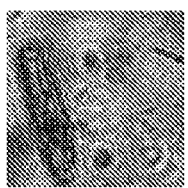 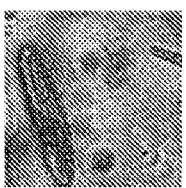 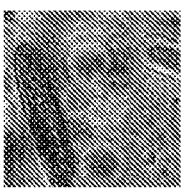
Fig. 3F    Fig. 3G    Fig. 3H    Fig. 3I    Fig. 3J

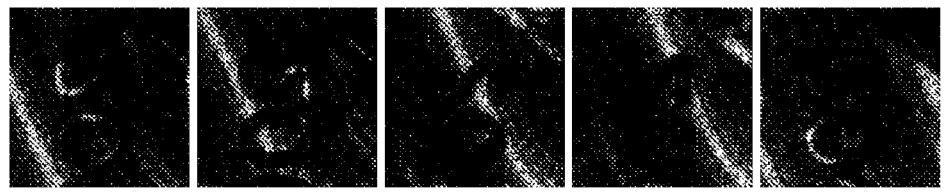
Fig. 6A  Fig. 6B  Fig. 6C  Fig. 6D  Fig. 6E
 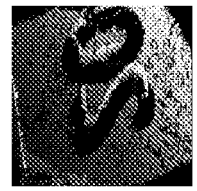
Fig. 6F  Fig. 6G
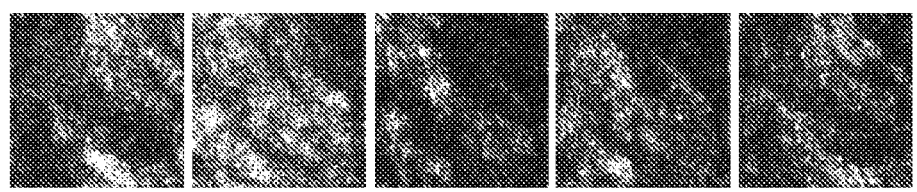
Fig. 7A  Fig. 7B  Fig. 7C  Fig. 7D  Fig. 7E
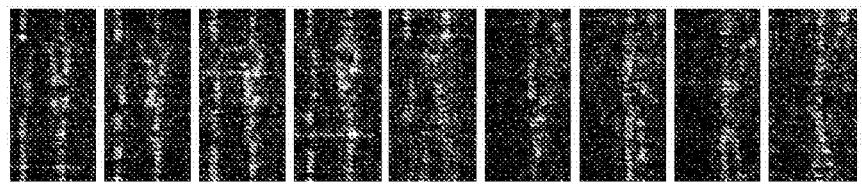
Fig. 7F

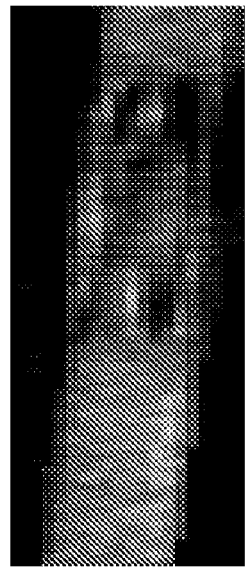 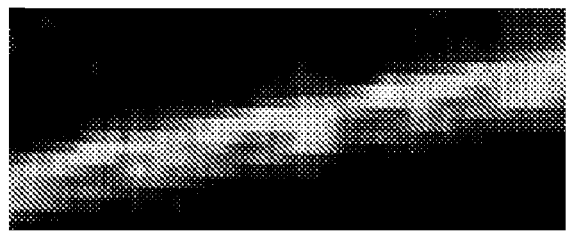
Fig. 30A　　　　　　　　Fig. 30B
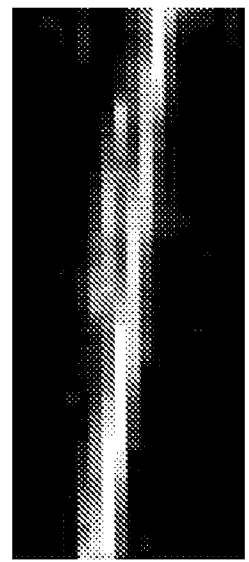 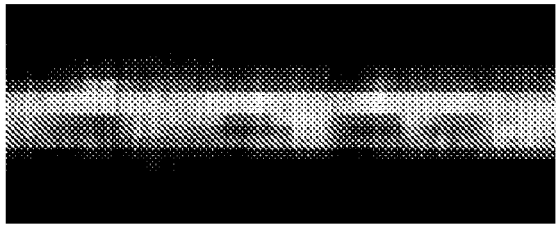
Fig. 30C　　　　　　　　Fig. 30D

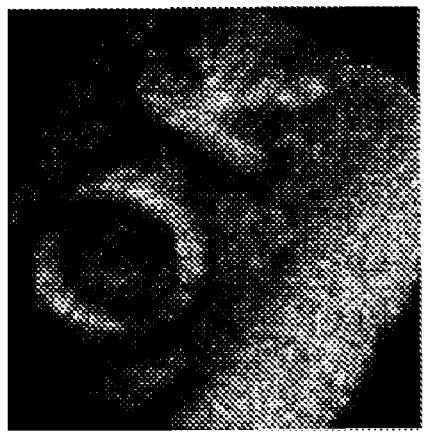 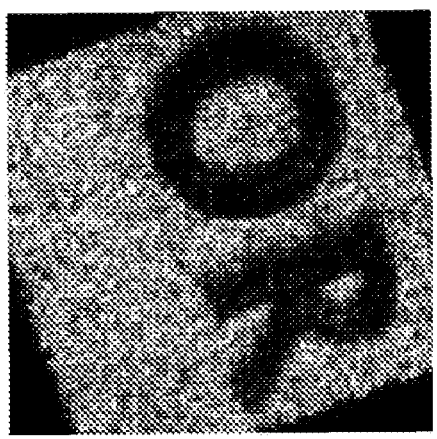
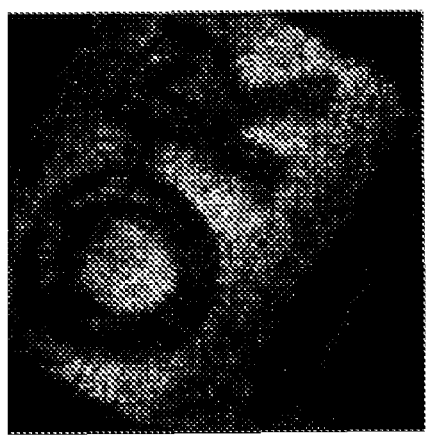 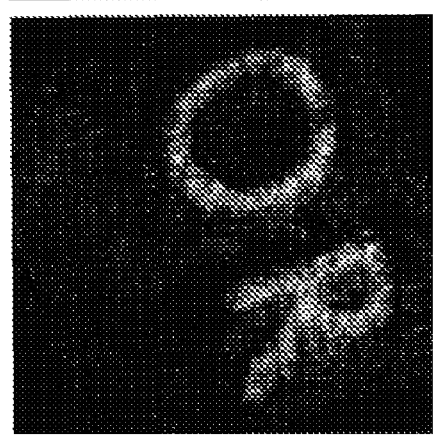
 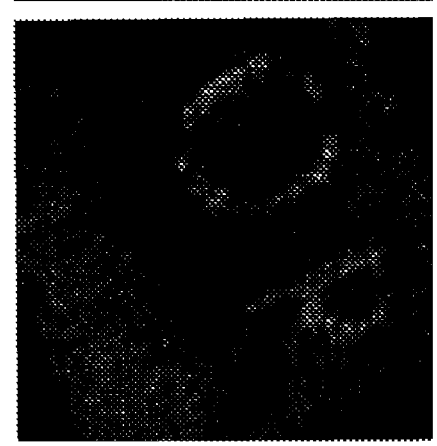
Fig. 31A  Fig. 31B

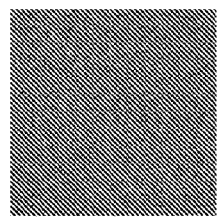 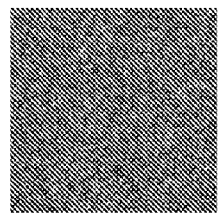 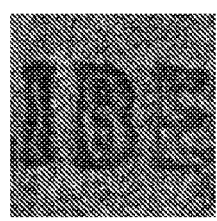
Fig. 34A　　　　Fig. 34B　　　　Fig. 34C
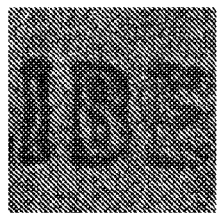 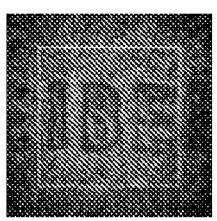 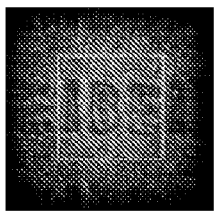
Fig. 34D　　　　Fig. 34E　　　　Fig. 34F
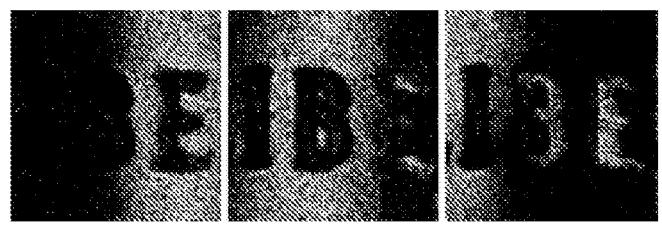
Fig. 35A
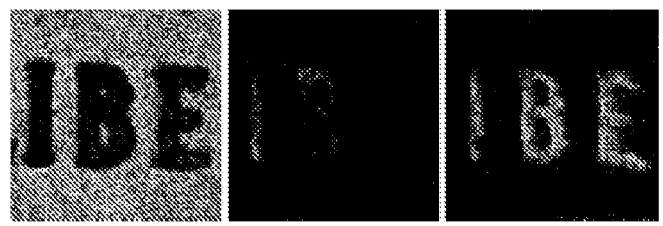
Fig. 35B

VARIABLE TOMOGRAPHIC SCANNING WITH WAVELENGTH SCANNING DIGITAL INTERFACE HOLOGRAPHY

CROSS-REFERENCE TO RELATED APPLICATIONS

This application is a continuation of prior filed International Application, Serial Number PCT/US06/25610 filed Jun. 29, 2006, which claims priority to U.S. provisional patent application No. 60/694,856 filed Jun. 29, 2005 which is hereby incorporated by reference into this disclosure.

STATEMENT OF GOVERNMENT INTEREST

This invention was made with U.S. government support under grant No. DBI0243237 awarded by the National Science Foundation. The U.S. government has certain rights in the invention.

BACKGROUND OF THE INVENTION

1. Field of the Invention

This invention relates to holography. More particularly, it relates to wavelength scanning digital interference holography.

2. Description of the Prior Art

Dennis Gabor is credited with the invention of holography in 1948 while attempting to improve the resolution of electron microscopy. At the time, however, his invention could not be made practical because there were no light sources available with the required coherence. The invention of laser and the introduction of off-axis holography provided the critical elements to make holography practical and a powerful tool for large areas of applications from metrology, data storage, optical processing, device fabrication, and even fine arts. The conventional process of holography using photographic plates, however, is time-consuming and cumbersome. Real time process is not feasible unless photorefractives and other nonlinear optical materials are used. Recently, the field of holography has been undergoing another paradigm shift by electronic image capture using CCD array cameras and digital processing of holographic images.

By recording the phase as well as intensity of light wave, holography allows reconstruction of the images of three-dimensional objects, and gives rise to a host of metrological and optical processing techniques. With the advance of computer and electronic imaging technology, it is now very practical and often advantageous to replace portions of the conventional holographic procedures with electronic processes. In digital holography, the holographic interference pattern is digitally sampled by a CCD camera and the image is numerically reconstructed by applying the results from the diffraction theory. This offers a number of significant advantages such as the ability to acquire the images rapidly, the availability of both amplitude and phase information of the optical field and the versatility of the processing techniques that can be applied to the complex field data.

Moreover, advances in digital imaging devices such as CCD and CMOS cameras and in computational and data storage capacities have been central to the widening applications of digital holography. Microscopic imaging by digital holography has been applied to imaging of microstructures and biological systems. In digital holography, the phase of the optical field, as well as the amplitude, results directly from the numerical diffraction of the optically recorded holographic interference pattern and leads to images of axial resolution at a mere fraction of wavelength. This can be used for numerical corrections of various aberrations of optical systems such as field curvature and anamorphism. In microscopy applications, the reconstructed image can be numerically focused to any plane in the object.

Images may also be advantageously reconstructed along an arbitrarily tilted plane. In most 3D microscopy systems, including optical coherence tomography (OCT) and wavelength scanning digital interference holography (WSDIH), the 3D volume is reconstructed as a set of scanning planes with the scanning direction along the optical axis of the system. The plane on which the reference mirror is located is called the scanning plane and its normal direction is defined as the scanning direction. If a tomographic image on a plane not parallel to the original reference mirror is required, it can be reconstructed by combining or interpolating points from different tomographic layers. The quality will be degraded, however, especially when the lateral resolution does not match well with the axial resolution. To get better results, the whole process needs to be physically repeated with the reference mirror tilted or the object rotated to a desired orientation.

The prior art includes a zero padding method to control the resolution for the FDF, where the new resolution is decreased by adding more zeros to increase the total pixel number. However, this method cannot be used to adjust the pixel resolution for a distance smaller than zmin. The prior art further includes a double-Fresnel-transform method (DFTM) to adjust the reconstruction pixel by introducing a transitional plane (TP) and implementing the FDF twice. The final resolution is proportional to the ratio $|z_2|/|z_1|$, where $|z_2|$ is the distance from the TP to the destination plane (DP) and $|z_1|$ is the distance from the hologram to the TP, with $|z_1|, |z_2| \geq z_{min}$. If the object-to-hologram distance is small, the above ratio can be adjusted only in a limited range. Specifically, the DFTM can not be used for resolution control if the DP is close to the hologram.

An improved system that overcomes these shortcomings is needed.

However, in view of the art considered as a whole at the time the present invention was made, it was not obvious to those of ordinary skill in this art how the identified needs could be met.

SUMMARY OF INVENTION

Wavelength scanning digital interference holography harnesses the power of digital holography. In one embodiment, the wavelength of a laser is scanned in a predetermined range in a plurality of steps and the exposure of a hologram is taken at each step of said plurality of steps. The optical field of a volume around the image location is calculated by numerical diffraction from each hologram and the exposures are numerically superposed together by adding the arrays elementwise so that an accumulated field array of the same size is produced. Numerous other embodiments are also disclosed.

BRIEF DESCRIPTION OF THE DRAWINGS

For a fuller understanding of the invention, reference should be made to the following detailed description, taken in connection with the accompanying drawings, in which:

FIG. 1A is a hologram image of a layer of onion cells at a first resolution;

FIG. 1B is an amplitude image of said layer;

FIG. 1C is a wrapped phase image thereof;

FIG. 1D is an unwrapped phase image thereof;

FIG. 1E is a hologram image of a layer of onion cells at a second resolution;

FIG. 1F is an amplitude image of said layer at said second resolution;

FIG. 1G is a wrapped phase image thereof at said second resolution;

FIG. 1H is an unwrapped phase image thereof at said second resolution;

FIG. 2A is a hologram image of a paramecium;

FIG. 2B is an amplitude image of said paramecium;

FIG. 2C is a wrapped phase image thereof;

FIG. 2D is an unwrapped phase image thereof;

FIG. 3A is an image of a paramecia at a first numerical focusing and a first distance;

FIG. 3B is an image of said paramecia at a second distance;

FIG. 3C is an image of said paramecia at a third distance;

FIG. 3D is an image of said paramecia at a fourth distance;

FIG. 3E is an image of said paramecia at a fifth distance;

FIG. 3F is an image of said paramecia at a second numerical focusing at a first distance;

FIG. 3G is an image of said paramecia at a second distance;

FIG. 3H is an image of said paramecia at a third distance;

FIG. 3I is an image of said paramecia at a fourth distance;

FIG. 3J is an image of said paramecia at a fifth distance;

FIG. 6A is a contour image of a penny at a first axial distance;

FIG. 6B is a contour image of a penny at a second axial distance;

FIG. 6C is a contour image of a penny at a third axial distance;

FIG. 6D is a contour image of a penny at a fourth axial distance;

FIG. 6E is a contour image of a penny at a fifth axial distance;

FIG. 6F is a plan view obtained by adding together the contour images of FIGS. 6A-E;

FIG. 6G is a perspective view obtained by adding together the contour images of FIGS. 6A-E;

FIG. 7A is an x-y transverse image of beef tissue at a first depth;

FIG. 7B is an x-y transverse image of beef tissue at a second depth greater than said first depth;

FIG. 7C is an x-y transverse image of beef tissue at a third depth greater than said second depth;

FIG. 7D is an x-y transverse image of beef tissue at a fourth depth greater than said third depth;

FIG. 7E is an x-y transverse image of beef tissue at a fifth depth greater than said fourth depth;

FIG. 7F is a collection of x-z cross-sectional images displaying variations of tissue layers across the field;

FIG. 29D is the fourth image of said four images;

FIG. 29E is the first image of a four image reconstruction of a contour image of a quarter at a second tilted angle;

FIG. 29F is the second image of said four images at said second tilted angle;

FIG. 29G is the third image of said four images at said second tilted angle;

FIG. 29H is the fourth image of said four images at said second tilted angle;

FIG. 29I is the first image of a four image reconstruction of a contour image of a quarter at a third tilted angle;

FIG. 29J is the second image of said four images at said third tilted angle;

FIG. 29K is the third image of said four images at said third tilted angle;

FIG. 29L is the fourth image of said four images at said third tilted angle;

FIG. 30A is a flat view of a y0-z0 cross-section from FIGS. 29A-D;

FIG. 30B is a flat view of a x0-z0 cross-section from FIGS. 29A-D;

FIG. 30C is a flat view of a y0-z0 cross-section from FIGS. 29E-H;

Figure 30E:
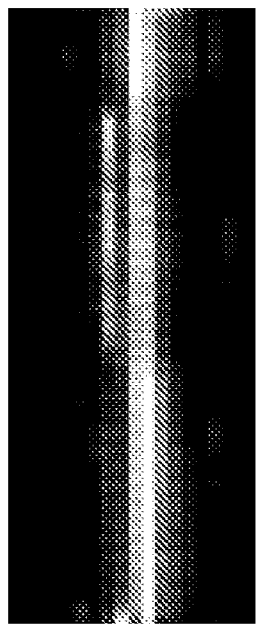
Figure 30F:
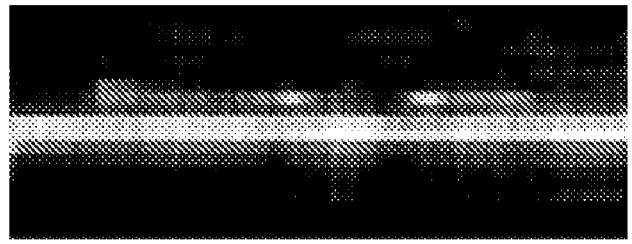
Figures 32A, 32B:
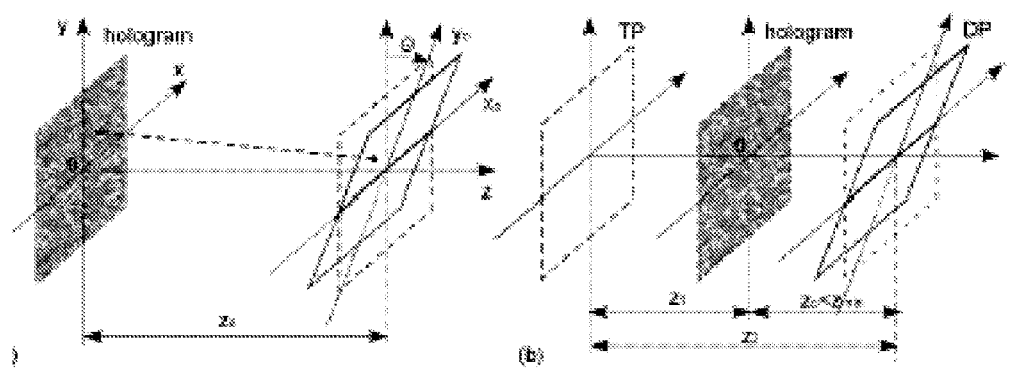
Figure 33:
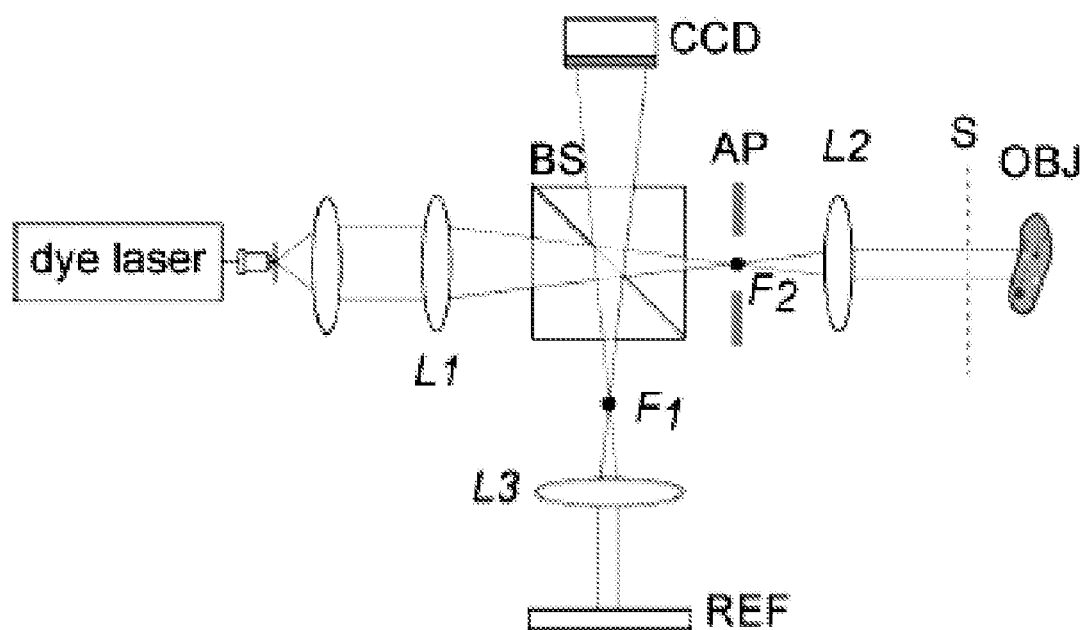

FIG. 30D is a flat view of a x0-z0 cross-section from FIGS. 29E-H;

FIG. 30E is a flat view of a y0-z0 cross-section from FIGS. 29I-L;

FIG. 30F is a flat view of a x0-z0 cross-section from FIGS. 29I-L;

FIG. 31A is a series of contour images at fixed axial distance intervals at a first tilted plane;

FIG. 31B is a series of contour images at fixed axial distance intervals at a second tilted plane;

FIG. 32A is a diagrammatic representation of a wavefield reconstruction on a tilted destination plane;

FIG. 32B is a diagrammatic representation of a wavefield reconstruction on a tilted destination plane including a transitional plane for resolution control;

FIG. 33 is a diagrammatic representation of an apparatus for digital interference holography applications;

FIG. 34A is a reconstruction from the Fresnel diffraction formula;

FIG. 34B is a reconstruction from the convolution method;

FIG. 34C is a reconstruction from the angular spectrum method;

FIG. 34D is a reconstruction from the double-Fresnel-transform method;

FIG. 34E is a reconstruction from the novel algorithm at a first pixel resolution;

FIG. 34F is a reconstruction from the novel algorithm at a second pixel resolution;

FIG. 35A is a series of contour images of a coin at fixed axial distance intervals in a plane tilted at a first angle in reconstruction; and FIG. 35B is a series of contour images of a coin at fixed axial distance intervals in a plane tilted at a second angle in reconstruction, said second angle being greater than said first angle.

DETAILED DESCRIPTION OF THE PREFERRED EMBODIMENT

Digital Holography for Biological Microscopy

Examples of digital holography of onion cells are shown in FIGS. 1A-D and 1E-H. FIGS. 1A-D depict a 100×100 μm2 area (416×416 pixels) of a layer of onion cells with z=174 μm. The cell walls are sharply focused in the amplitude image and the phase image shows accurate representation of optical thickness, modulo wavelength, of the cell bodies. The images of 70×70 μm2 area (464×464 pixels) in FIGS. 1E-H focus on a nucleus of a cell with z=62 μm. The phase image is a clear view of the optical thickness variation of the nucleus in the middle of the bulged body of the cell. A simple quantitative analysis of the cell's index of refraction is possible. By counting the number of fringes, the optical thickness of the nucleus is easily determined to be $3.5\lambda=1.86$ μm thicker than the cell body. Assuming that the shape of the nucleus is spherical so that its thickness is the same as the 19 μm diameter of the circular image, then the refractive index difference between the nucleus and the cell body is 0.093. Phase-unwrapped images are generated using a software algorithm.

FIGS. 2A-D display digital holography of a paramecium, which is a unicellular protozoan with considerable intracellular complexity. In said FIGS. 2A-2D, the magnification image has an area of 250×250 μm2 (464×464 pixels) with z=770 μm. The most conspicuous as a bright spot in the amplitude image FIG. 2B is one of two contractile water vacuoles. The other water vacuole and the macronucleus are not readily visible in the amplitude image, while there is a hint of them in the phase images (FIGS. 2C and D). Slightly different directions of reconstruction reference waves are used in said phase images, which may be useful for emphasizing different aspects of the microscopic images. A higher magnification image of 90×90 μm2 area (432×432 pixels), with a z varying from 50 to 250 μm is shown in FIGS. 3A-E, where several food vacuoles are visible. Numerical focusing is another unique capability of digital holography, where a single hologram is used to calculate the optical field at any number of image planes, emulating the focusing control of a conventional microscope. As the focus is varied, the food vacuoles as well as the cell wall passing through the various focus are observable. Another example of numerical focusing is displayed in FIGS. 3F-J, where a paramecium as well as a euglena (the thin rod shape in the upper right of the field) are within view but separated by about 400 μm of axial distance. In said FIGS. 3F-J, the magnification image has a 250×250 μm2 area (464×464 pixels), with a z varying from 200 to 800 μm.

Figures 4A, 4B, 4C, 4D, 4E:
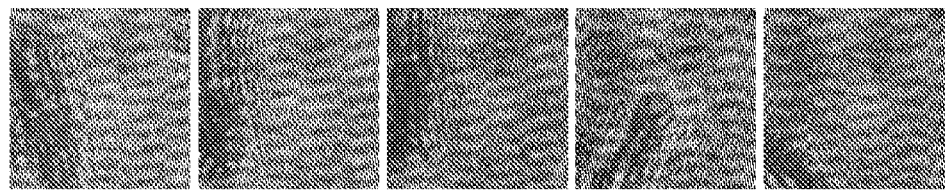
FIG. 4A is the first frame of a five frame holographic movie having hologram images.
FIG. 4B is the second frame thereof.
FIG. 4C is the third frame thereof.
FIG. 4D is the fourth frame thereof.
FIG. 4E is the fifth frame thereof.
Figures 4F, 4G, 4H, 4I, 4J:
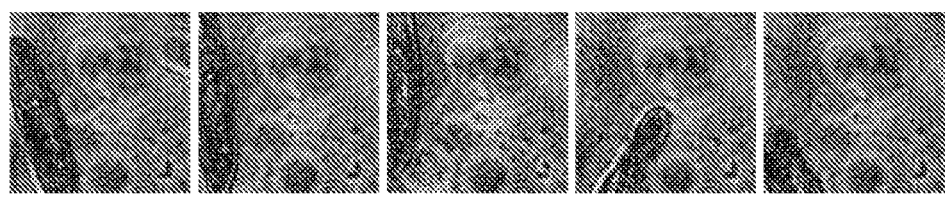
FIG. 4F is the first frame of a five frame holographic movie having amplitude images.
FIG. 4G is the second frame thereof.
FIG. 4H is the third frame thereof.
FIG. 4I is the fourth frame thereof.
FIG. 4J is the fifth frame thereof.
Figures 4K, 4L, 4M, 4N, 4O:
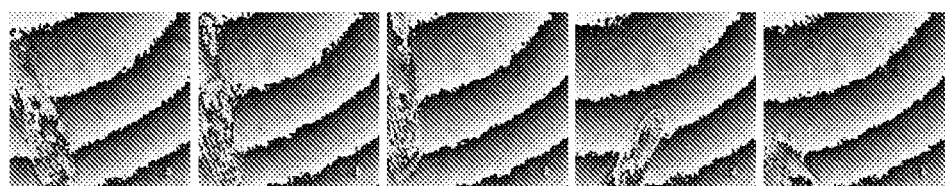
FIG. 4K is the first frame of a five frame holographic movie having phase images.
FIG. 4L is the second frame thereof.
FIG. 4M is the third frame thereof.
FIG. 4N is the fourth frame thereof.
FIG. 4O is the fifth frame thereof.
Figures 5A, 5B, 5C, 5D, 5E:
FIG. 5A is a holographic image of a penny with wavelength N=1.
FIG. 5B is a holographic image of a penny with wavelength N=2.
FIG. 5C is a holographic image of a penny with wavelength N=4.
FIG. 5D is a holographic image of a penny with wavelength N=8.
FIG. 5E is a holographic image of a penny with wavelength N=20.

When a movie of digital holograms has been recorded, the images of the object may be reconstructed and focused upon in any focal plane as a specimen under observation moves up and down in the image space. This is the most unique capability of digital holographic movie in contrast to conventional video microscopy, where only the images of the specific focal plane that was used in recording are preserved and the information of all the other planes is lost. A series of holograms may be recorded by synchronizing the camera with laser pulses under the control of a digital delay generator. The amplitude and phase images are calculated while adjusting image distances for best focus on the object under observation. The reconstructed images are composed into AVI files. FIGS. 4A-O shows a few frames of the holographic movies of a paramecium swimming around with a few euglenas. The amplitude and phase images are reconstructed while adjusting the image distances over a 20 μm range to maintain the paramecium in focus. The area is 250×250 μm2 (464×464 pixels) and the numerical focus is adjusted in the range of z=850~870 μm in order to track the paramecium in focus.

Turning now to wavelength-scanning digital interference holography, it is observed that although the hologram produces a 3D image of the optical field, this does not by itself yield the topographic or tomographic distance information, other than by focusing and defocusing of the image points. The distance information can be obtained by counting the number of wavelengths or some multiples of it, which is the basis of various interference techniques. A well-known technique is the interference of two holograms recorded at two different wavelengths, resulting in a contour interferogram with the axial distance between the contour planes inversely proportional to the difference in wavelengths, $\Lambda \sim \lambda^2/\Delta\lambda$. In digital holography, it is possible to extend the process to recording and reconstruction of many holograms without introducing any wavelength mismatch. If a number, N, of regularly spaced wavelengths are used for recording and reconstruction, then the peaks of the cosine squared intensity variation of the two-wavelength interference become sharper and narrower, $\delta=\Lambda/N$, as when a number of cosines with regularly spaced frequencies are added. Wavelength scanning digital interference holography (WSDIH) is a novel method of microscopic three-dimensional imaging by numerical superposition of a number of holographic fields taken with varying wavelengths. Unlike some of the other 3D microscopic methods such as confocal microscopy and optical coherence tomography, the digital interference holography does not involve pixel-by-pixel mechanical scanning of three-dimensional volume and yet achieves comparable resolutions.

An object is first illuminated by a laser beam of wavelength $\lambda$. A point P (at $r_P$) on the object scatters the illumination beam into a Huygens wavelet, $A(r_p)$ exp $(ik|r-r_p|)$, where $A(r_p)$ is proportional to the amplitude and phase of the scattered wavelet. For an extended object, the field at r is:

$$E(r) \sim \int A(r_P)\exp(ik|r-r_P|)d^3r_P, \qquad (16)$$

where the integral is over the object volume. The amplitude and phase of this field at the hologram plane z=0 is recorded by the hologram. If the holographic process is repeated using N different wavelengths, and the reconstructed fields are all superposed together, then the resultant field is:

$$E(r) \sim \sum_k \int A(r_P)\exp(ik|r-r_P|)d^3 r_P \sim \int A(r_P)\delta(r-r_P)d^3 r_P \sim A(r). \qquad (17)$$

That is, for a large enough number of wavelengths, the resultant field is proportional to the field at the object and is nonzero only at the object points. In practice, if a finite number N of wavelengths at regular intervals of $\Delta(1/\lambda)$ is used, then the object image $A(r)$ repeats itself (other than the diffraction/defocusing effect of propagation) at a beat wavelength $\Lambda=[(\Delta(1/\lambda)]^{-1}$, with axial resolution $\delta=\Lambda/N$. By use of appropriate values of $\Delta(1/\lambda)$ and N, the beat wavelength $\Lambda$ can be matched to the axial extent of the object, and $\delta$ to the desired level of axial resolution.

In a WSDIH experiment, the wavelength of a dye laser is scanned in the range of 575.0~605.0 nm in twenty (20) steps, taking the exposure of a hologram at each step. The optical field of a volume around the image location is calculated by numerical diffraction from each hologram. At this point, the field patterns in the individual 3D arrays show little variation along a few millimeters of z-direction. In the next step of the novel method, the twenty (20) 3D arrays are numerically superposed together, by adding the arrays elementwise, resulting in the accumulated field array of the same size. This new array has a field distribution that represents the three-dimensional object structure, with axial range of $\Lambda=220$ μm and axial resolution of $\delta=11$ μm, as described above. FIGS. 5A-E illustrate the building up of axial resolution as a series of holographic images are superposed using a range of wavelengths N. The five frames shown are with N equal to one (1), two (2), four (4), eight (8), and twenty (20) wavelengths superposed, respectively. The contour widths narrow as the synthesized coherence length shortens. FIGS. 6-G show a few contour images at 60 μm axial distance intervals. More particularly, FIGS. 6A-E provide contour images at various axial distances in the WSDIH image of a penny. The image volume is 2.62 mm×2.62 mm×200 μm, λ=575.0~605.0 nm and N=20, so that Λ=220 μm and δ=11 μm. FIG. 6F is a flat view of DIH formed by adding all of the contour images. FIG. 6G is a perspective view of the 3D reconstruction of the penny by WSDIH.

Digital interference holography (DIH) is a coherent imaging method and is capable of tomographic imaging through a thickness of scattering medium. FIGS. 7A-E are the result of a DIH imaging experiment on a 2.62×2.62 mm2 area of beef tissue. The image volume is 2.62 mm×2.62 mm×750 μm. The wavelengths are in the range of 585.0~591.9 nm at forty-one (41) steps so that the axial range is Λ=2.00 mm and the axial resolution δ=50 μm. The specimen was a thin layer of beef tissue pressed to about 1.5 mm thickness on a slide glass and otherwise exposed to air. The images in FIG. 7A show tissue layers at several depths up to about 1.5 mm below the surface, λ=585.0~599.0 nm and N=30 so that Λ=750 μm and δ=25 μm. Much of the reflection signals are apparently from the tissue-air and tissue-glass interface. The striation of muscle fiber bundles (~100 μm thickness) is almost discernible. FIG. 7F shows variations of the tissue layers in a few x-z cross-sectional images.

Figure 8:
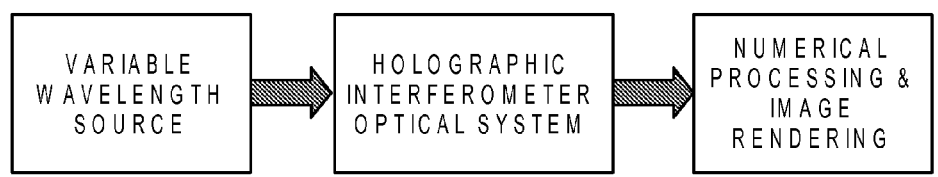
FIG. 8 is a diagrammatic depiction of a wavelength scanning digital interference hologram tomographic microscopy system.

The novel WSDIH Tomographic Microscopy System is diagrammatically depicted in FIG. 8.

It includes three subsystems: 1) a variable wavelength source to provide the necessary range of wavelengths of light with sufficient coherence length for holographic imaging; 2) a holographic interferometer and optical system, where the holographic interference pattern is formed for image acquisition by a camera or cameras; and 3) numerical processing and image rendering, normally performed in a dedicated computer system. Improvements in these subsystems are described individually as follows.

Holographic Interferometer Optical Systems

Figure 9:
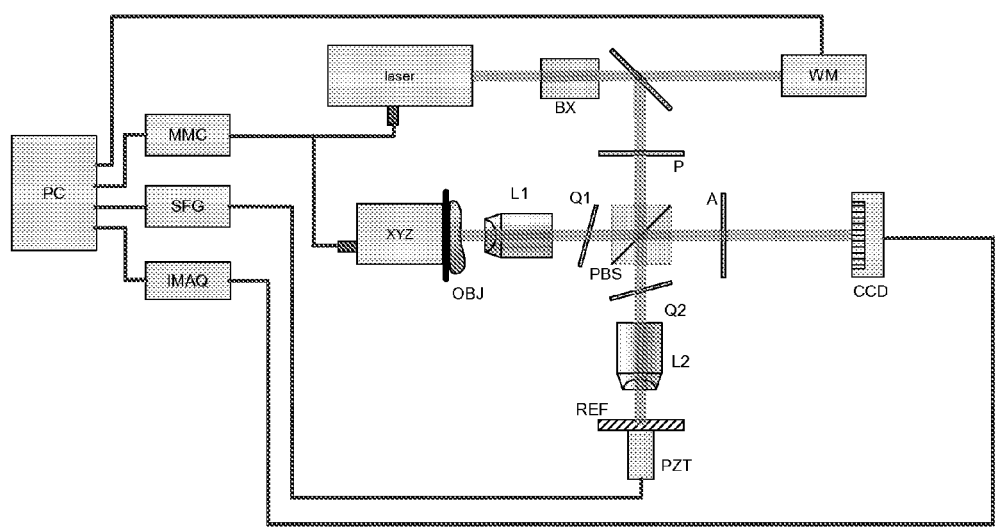
FIG. 9 is a diagrammatic depiction of a holographic system based upon a Michelson interferometer.

A holographic interferometer optical system, specifically a holographic system based on the Michelson or Linnik interferometer configuration, is schematically depicted in FIG. 9. This laboratory apparatus for DIH imaging includes an interferometer having a polarizing beam splitter (PBS), a pair of quarterwave plates (Q's), a polarizer (P) and an analyzer (A) to optimize the interference of the object and reference beams. The CCD is placed at the conjugate plane, with respect to objective lens L1, of a plane a short distance in front of the object. Lens L2 and the reference mirror are positioned at respective positions equivalent to the object arm. The beam forming optics BX includes a beam expander, spatial filter, and collimator, as necessary. The wavelength of the dye laser is tuned by the motorized micrometer (motormike) driving the intracavity Brewster filter. The computer is interfaced with a motormike controller (MMC) and an image acquisition board (IMAQ) that connects to the CCD camera. The wavelength of the laser is monitored by the wavemeter (WM) and input to the computer. Assuming one holographic exposure at each wavelength, the entire holographic image acquisition is complete in 250 ms for a scan of 30 wavelengths, so that the 3D volume of image field with 30 z-sections can be generated.

The novel DIH imaging system operates as follows. At a given wavelength, the image of the object is projected onto the CCD camera plane together with the reference beam in superposition. Correct positioning of the two microscope objectives L1 and L2 assure wavefront curvature matching, although it is possible to compensate for the curvature mismatch or some other aberration of the optical system during the numerical diffraction calculation. The holographic interference pattern is captured by the CCD camera and stored in the computer. The holographic exposure is repeated N times by stepping through the range of wavelengths, through activation of the computer-controlled motormike. When the wavelength scan is complete, a reconstruction program calculates the optical field of a three-dimensional image volume by numerical diffraction of a reference wave propagating from the hologram plane to a series of N planes in the image volume. This is done for each of the N holograms to generate N 3D arrays of complex numbers, which are then added together. The result is a three-dimensional numerical image of the object with a bright voxel at every back-reflection point of the object—a tomographic or topographic image.

Figure 10:
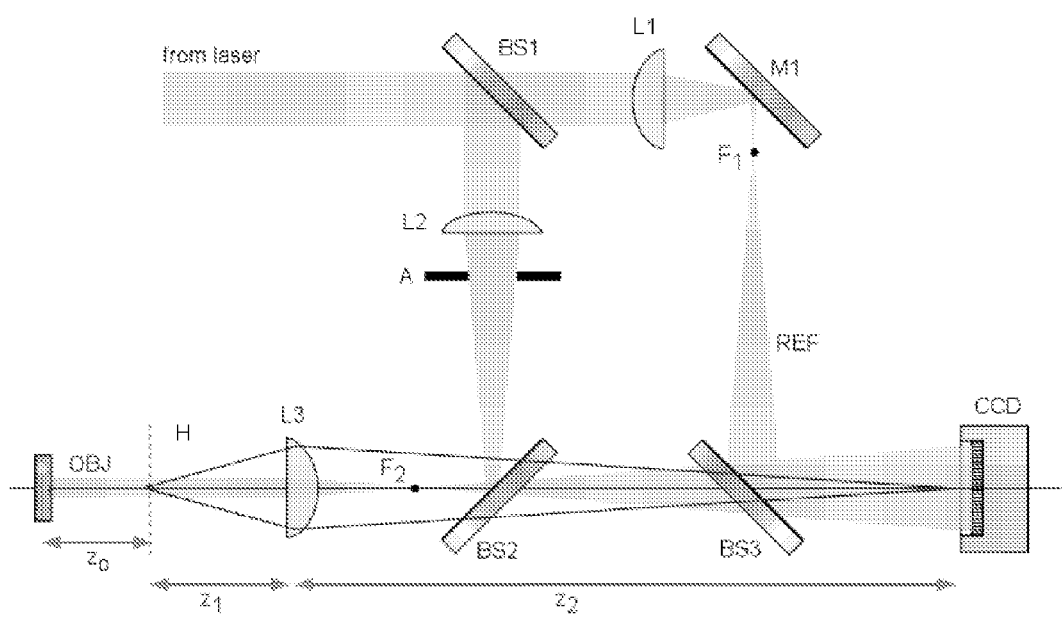
FIG. 10 is a diagrammatic depiction of a holographic system based upon a Mach-Zhender Reflection Type Interferometer.

A holographic system based on Mach-Zhender interferometer (reflection type) is depicted in FIG. 10; specifically, FIG. 10 depicts a modified Mach-Zhender interferometer system. In reflective geometry, a collimated beam from a laser is split into object and reference beams by beam splitter BS1. The object beam is focused by lens L2 onto focal point F2, which is also the front focal point of objective lens L3. Accordingly, the object is illuminated by a collimated beam. Aperture A is placed at the conjugate point of the object with respect to L3, so that the aperture is imaged on the object and the illumination is confined to an area of the object that is being imaged by the holographic system. This is mandatory to prevent light scattered from the surrounding area of the object from entering the camera, thereby contributing to the noise of the imaging system. The laser light is reflected by the object and travels toward the camera, which is placed at the conjugate plane of the plane H with respect to L3. The reference beam's focus F1 is equidistant from BS3 as F2, so it is optically equivalent to a collimated beam incident from the left of objective L3. The object and the reference beams are tilted with respect to each other in an off-axis hologram arrangement and object spectrum can be separated from other spectral components of the hologram if the off-axis angle of the incident beam is properly adjusted. M1 is a mirror, OBJ is the object, REF is the reference beam, H is the hologram plane, imaged to the CCD plane and CCD is the camera.

Figure 11:
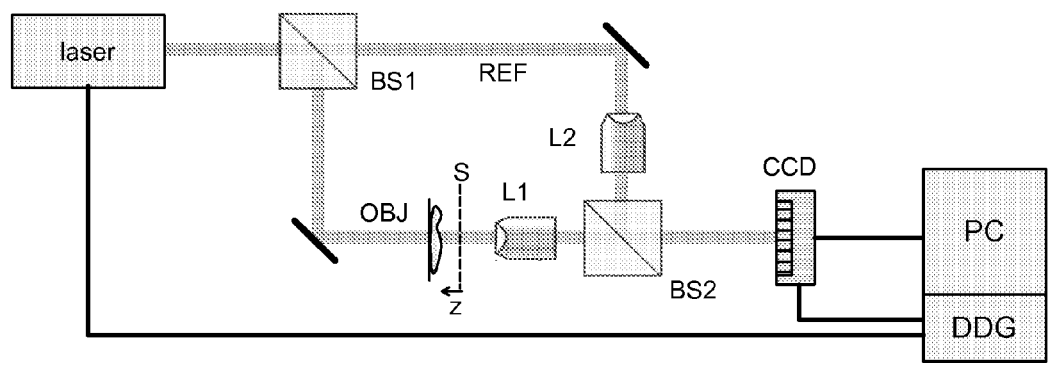
FIG. 11 is a diagrammatic depiction of a holographic system based upon a Mach-Zhender Transmission Type Interferometer.

A holographic system based on Mach-Zhender interferometer (transmission type) is depicted in FIG. 11. This apparatus provides transmissive geometry using a pulsed laser. A magnified image of an object specimen and the reference beam are projected onto the CCD camera. A pair of similar microscope objectives (L1 and L2) in the two optical branches is used to match the curvature of the two wavefronts. A digital delay generator (DDG) triggers both the laser and the camera. PC is a personal computer.

Variable Wavelength Sources

The general requirements for the variable wavelength sources are:

The spectral width, δλ, of light must be sufficiently narrow so that the coherence length is longer than the axial dimension, Z, of the object volume to be imaged:

$$Z = \frac{\lambda^2}{\delta\lambda}.$$

The tuning range of the wavelength, Λ, must be sufficiently wide so that the synthesized coherence length matches the desired axial resolution, δz, of the image:

$$\delta z = \frac{\lambda^2}{\Lambda}.$$

Laser Sources

For tunable dye lasers with spectral width of MHz or GHz, the coherence length is typically from ten (10) mm to many meters, and for microscopic imaging the coherence length is usually not an issue. The tuning range using a single dye is typically 25 nm so that the axial resolution is about 10 µm. A drawback of the dye laser is the relatively high cost and high-maintenance operation. However, available compact standing-wave cw dye laser or miniature pulsed dye laser systems minimize these problems.

Figure 12:
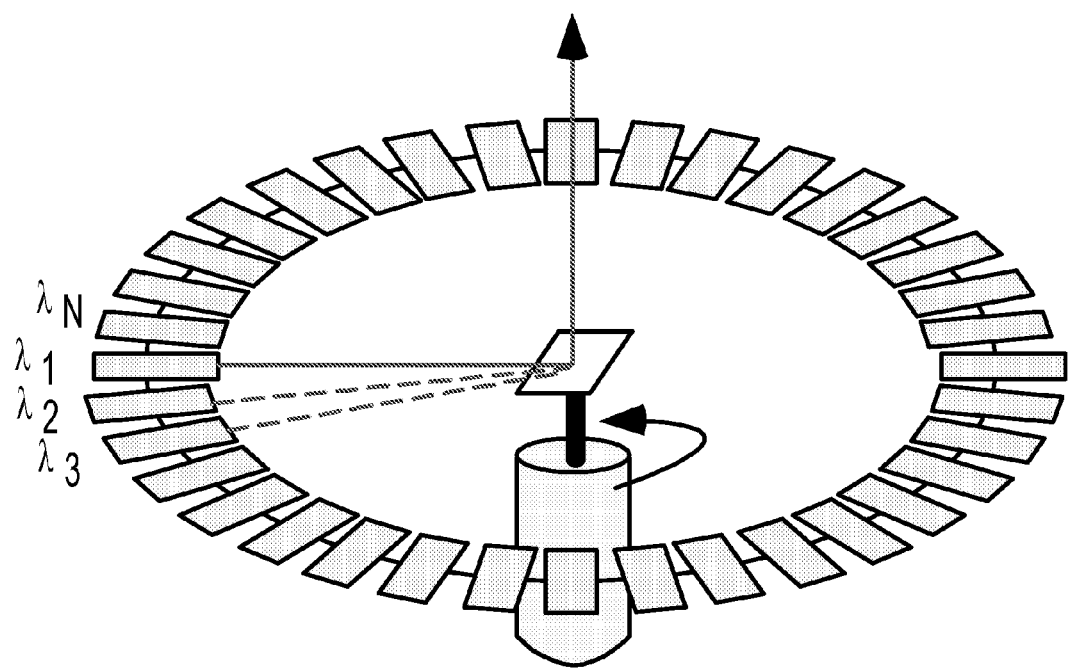
FIG. 12 is a diagrammatic depiction of a set of laser diodes disposed in encircling relation to a rotating mirror.

An alternative is to use an array of laser diodes. In one possible configuration, a set of laser diodes with emission wavelengths spanning the specified range, as described above, are arranged around a circle as depicted in FIG. 12. Individual laser diodes are flashed in sync with a rotating mirror that deflects the firing laser beam into the holographic interferometer, as depicted in the diagram. Laser diodes typically have one (1) mm coherence length and a set can be chosen to span a wide range in the near infrared. This allows narrower axial resolution as well as better penetration into tissues.

White Light and Interference Filters

Figure 13:
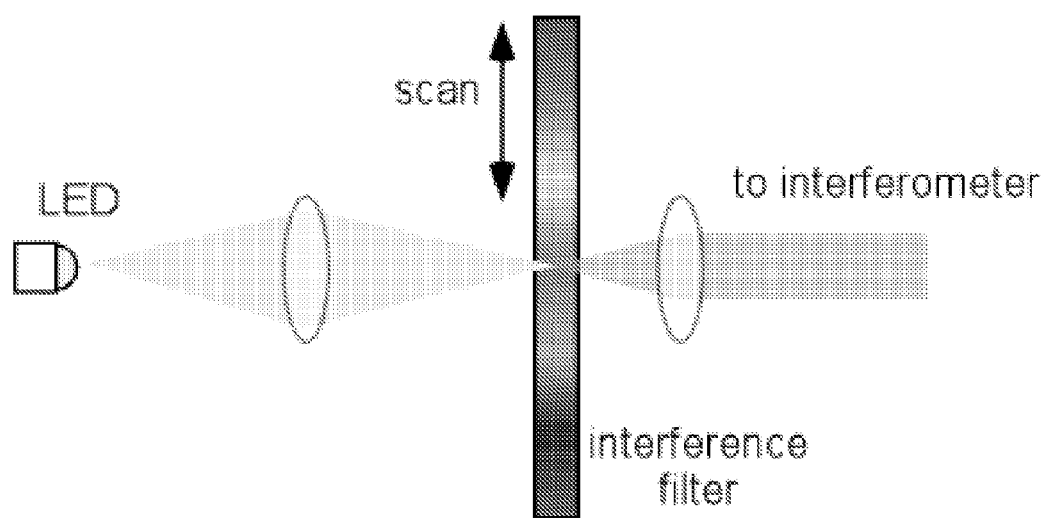
FIG. 13 is a diagrammatic depiction of a white light and interference filter.

White light sources with 250 nm, for example, or more spectral range can yield axial resolution of 1 µm or less. Tuning across this range with narrow spectral width can be accomplished with a linear variable interference filter, as depicted in FIG. 13. In a possible configuration, a variable interference filter is fabricated with 1 nm passband width and the center wavelength varying across its 50 mm length from 400 to 650 nm. The lateral dispersion is then 1 nm per 200 µm. A white light high power LED, for example, is focused to 200 µm spot on the interference filter. The filtered light, which as one (1) nm spectral width, is used to illuminate the holographic interferometer. This yields coherence length of 250 µm, which is sufficient for imaging of thin tissue layers. Tuning or wavelength scanning is accomplished by mechanical translation of the interference filter across its length.

Broad range scanning with white light can also be used to accomplish four-dimensional spectral tomography, as follows. The set of holograms is acquired in the usual manner, scanning the wavelength over 250 nm range at one (1) nm steps. WSDIH tomography reconstruction is carried out using 25 nm range, such as 400 to 425 nm. This yields a tomographic image with 2.5 µm axial resolution, instead of 1.0 µm using 250 nm range. The WSDIH reconstruction is repeated 425-450 nm, 450-475 nm, etc. The result is a set of ten (10) tomographic 3D images with 2.5 µm axial resolution. A spectral profile with ten (10) data points across the visible spectrum is obtained for each voxel element. The subranges of WSDIH are chosen as a compromise between the axial resolution and spectral resolution.

Numerical Image Reconstruction

Numerical Reconstruction Based on Angular Spectrum Method

A common method for calculating the propagation of the optical field is based on the Fresnel diffraction theory. Let $E_0(x_0,y_0)$ be the two-dimensional pattern of the optical field on an $(x_1,y_1)$ plane. Then the field $E(x,y)$ at another plane a distance Z away is given by:

$$E(x,y) = E_0 \oplus S(x,y;z) \quad (1)$$

where the point spread function (PSF) is:

$$S(x,y;z) = -\frac{ik}{2\pi z}\exp\left[ik\sqrt{x^2+y^2+z^2}\right]. \quad (2)$$

The convolution can be numerically calculated by three fast Fourier transforms, or the PSF can be simplified by the Fresnel approximation as:

$$S(x,y;z) = -\frac{ik}{2\pi z}\exp\left[ikz + \frac{ik}{2z}(x^2+y^2)\right], \quad (3)$$

which allows the calculation to be carried out as a single Fourier transform.

The resolution of the reconstructed images, determined from the Fresnel diffraction formula as a single Fourier transform, varies as a function of the reconstruction distance z as $\Delta_1=\lambda z/(N_x\Delta_0)$, where $\Delta_0$ and $\Delta_1$ are the resolutions of the hologram and the reconstructed image, respectively. To get consistent resolution, the Fresnel diffraction can also be implemented as a convolution, as described above. However, both of the above approaches assume the Fresnel approximation, which limits a minimum reconstruction distance z. The problems associated with the Fresnel diffraction formula are avoided by using the angular spectrum algorithm. From Fourier optics, if E(x, y; 0) is the object wave field at plane z=0, the corresponding angular spectrum of the object wave at this plane is the Fourier transform:

$$F(k_x,k_y;0) = \int\int E(x,y;0)\exp[-i(k_xx+k_yy)]dxdy, \quad (13)$$

where $k_x$ and $k_y$ are corresponding spatial frequencies of x and y. The object angular spectrum $F(k_x,k_y;0)$ can be separated from other spectral components of the hologram with a numerical band-pass filter if the off-axis angle θ of the incident beam is properly adjusted. The object field E(x,y; 0) can be rewritten as the inverse Fourier transform of its angular spectrum, properly filtered:

$$E(x,y;0) = \int\int F(k_x,k_y;0)\exp[i(k_xx+k_yy)]dk_xdk_y, \quad (14)$$

The complex-exponential function $\exp[i(k_xx+k_yy)]$ may be regarded as a projection, on to the plane z=0, of a plane-wave propagating with a wave vector $(k_x,k_y,k_z)$, where $k_z=[k^2-k_x^2-k_y^2]^{1/2}$ and $k=2\pi/\lambda$. After propagating along the z axis to a new plane, the field distribution is:

$$E(x,y;z) = \int\int F(k_x,k_y;0)\exp[i(k_xx+k_yy+k_zz)]dk_xdk_y, \quad (15)$$

This is the angular spectrum method and the resolution of the reconstructed images is the same as that in the hologram plane. In spite of the apparent differences, the angular spectrum method will yield identical predictions of diffracted field as the first Rayleigh-Sommerfeld solution. However, as an approximate Rayleigh-Sommerfeld solution, Fresnel diffraction is not capable of reconstructing the wave field near to the hologram plane.

Figures 14A, 14B, 14C:
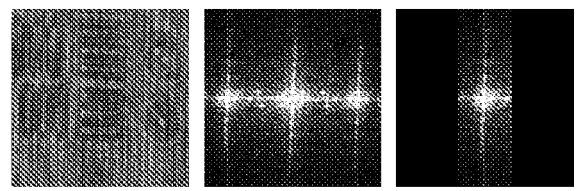
FIG. 14A is a digital hologram of a dime.
FIG. 14B is the Fourier spectrum of the FIG. 14A hologram.
FIG. 14C is the object spectrum of the FIG. 14A hologram.
Figures 14D, 14E, 14F:
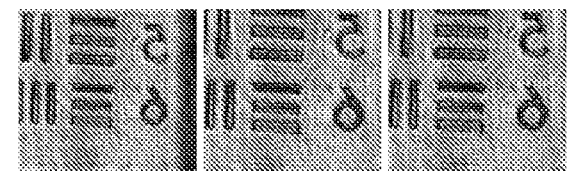
FIG. 14D is an image calculated by the Fresnel transform.
FIG. 14E is an image calculated by the convolution method.
FIG. 14F is an image calculated by the angular spectrum method.

FIG. 14a shows a captured hologram of a resolution target. The selected area of the hologram has a size of 1.535 mm×1.535 mm with 256×256 pixels. The laser wavelength is 594 nm and the distance z from the object to the H plane is 18 mm, which is larger than the minimum object-to-hologram distance $z_{min}$=15.5 mm calculated from Eq. (12). From the Fourier transform of the hologram, shown in FIG. 14B, the object spectrum (square outline) can be separated from other spectral components, as shown in FIG. 14C. Thus the object information is successfully extracted from the hologram, and can readily be used to reconstruct a wave field at different positions along the z axis. FIGS. 14D-F show the reconstruction results from the Fresnel diffraction formula, its convolution form and the angular spectrum method. The reconstructed resolution directly from the Fresnel diffraction formula is given as $\Delta_1=\lambda z/(N_x\Delta_0)$, and turns out to be $\Delta x_o\approx 7$ µm, which is slightly larger than the resolution of the hologram $\Delta_0$=6 µm. Thus the reconstructed image becomes smaller in FIG. 14D. However, either Fresnel convolution or angular spectrum algorithm gives a consistent reconstruction resolution, which is the same as the hologram.

Figures 14G, 14H, 14I:
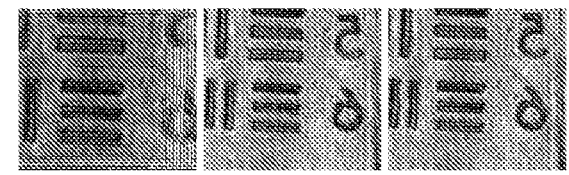
FIG. 14G is an image calculated by the Fresnel transform.
FIG. 14H is an image calculated by the convolution method.
FIG. 14I is an image calculated by the angular spectrum method.

Next the hologram is recorded with a new distance z=12 mm, which is now smaller than the $z_{min}$=15.5 mm, and all the other parameters are the same as above. FIG. 14G clearly shows the reconstructed images with aliasing of the Fresnel diffraction formula, and the results from the convolution method and the angular spectrum method are shown in FIGS. 14H and 14I). Although the Fresnel approximation condition is not strictly satisfied in this example, the Fresnel diffraction or its convolution algorithm can still give a fairly accurate reconstruction. This is because the resolution target is a relatively smooth and slowly varying object, and the major contribution to the wave field at a point $(x_o,y_o)$ comes from points (x,y) for which x≈$x_o$ and y=$y_o$, so that the higher-order terms of the expansion are unimportant. However, for a diffuse or diffractive object, the higher-order terms in Fresnel approximation are more detrimental if the distance z is not large enough.

Figures 15A, 15B, 15C:
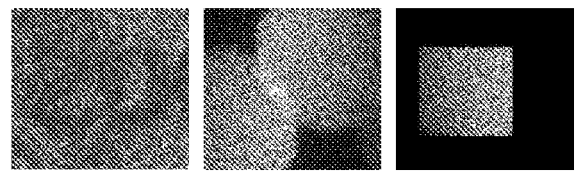
FIG. 15A is a hologram image of a penny.
FIG. 15B is Fourier spectrum image thereof.
FIG. 15C is an object spectrum image thereof.
Figures 15D, 15E, 15F:
FIG. 15D is an image calculated by Fourier transform.
FIG. 15E is an image calculated by the convolution method.
FIG. 15F is an image calculated by the angular spectrum method.
Figures 15G, 15H, 15I:
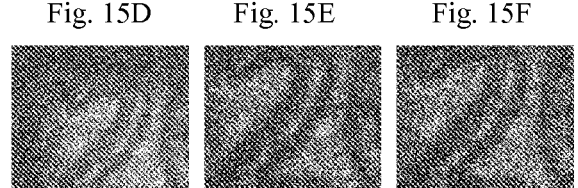
FIG. 15G is an image calculated by Fourier transform.
FIG. 15H is an image calculated by the convolution method.
FIG. 15I is an image calculated by the angular spectrum method.

An example of a diffuse object is depicted in FIGS. 15A-I. Specifically, said Figs. shows a hologram of a dime. FIG. 15A show the spectrum of the hologram, FIG. 15B the Fourier spectrum and FIG. 15C the object spectrum. In FIGS. 15A-C, the field area is 2.62 mm×2.62 mm with 256×256 pixels, the distance z from the object to H plane is 3.9 mm, which is less than $z_{min}$=45.4 mm. In FIGS. D-F, the field area is 1.00 mm×1.00 mm with 380×380 pixels, z=5.9 mm and zmin=4.6 mm (λ=575 nm. FIGS. 15D and G are calculated by Fresnel transform. FIGS. 15E and H are calculated by the convolution method, and FIGS. 15 F and I are calculated by the angular spectrum method. The first two methods cannot correctly reconstruct the object, whereas the angular spectrum method works well. FIGS. 15G-I show another set of results when the distance z is larger than the minimum object-to-hologram distance. The above experiment clearly shows the effectiveness of the angular spectrum method for numerical reconstruction in digital holography. Its biggest advantage is that it allows calculation of the image at any distance from the hologram plane down to zero distance.

Image Reconstruction Along Arbitrarily Tilted Plane

Figure 16:
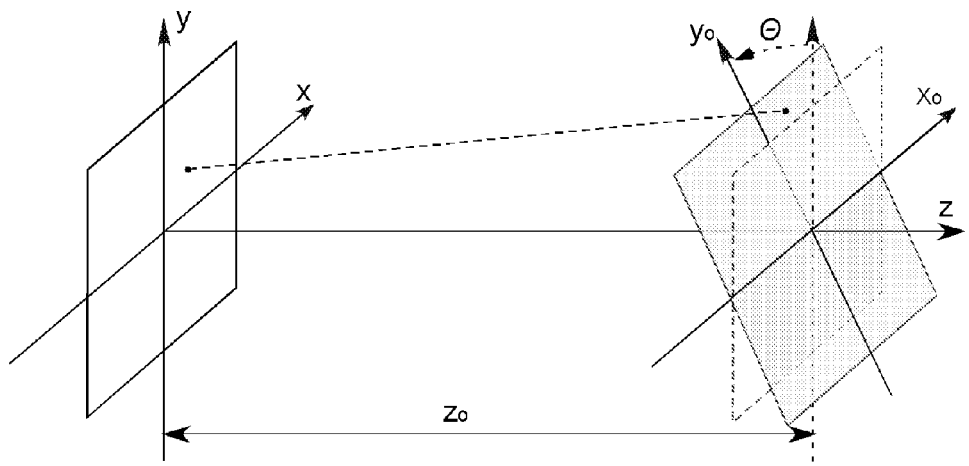
FIG. 16 is a diagrammatic representation of wavefield reconstruction on a tilted plane.

The novel method is capable of variable tomographic scanning with flexible selection of scanning planes without physically repeating the scanning or recording process as required by the prior art. The method is based on the principle of wavelength scanning digital interference holography. Tomographic images are conventionally obtained with a fixed scanning direction parallel to the optical axis of the system. Since the advantage of digital holography is that a single hologram records the entire three-dimensional information of the object, the object wave distributions and the synthesized tomographic image at an arbitrarily tilted plane can be reconstructed, and selective tomographic scanning with different orientation is possible. This tilted reconstruction plane then functions as the scanning plane in the WSDIH. FIG. 16 depicts reconstruction of the wavefield on a tilted x0-y0 plane for a given wave distribution on the x-y hologram plane.

Diffraction from a tilted plane based on the Rayleigh-Sommerfeld diffraction formula was previously studied for computer-generated holograms by D. Leseberg et al, and was later applied for numerical reconstruction of digital holography with changing viewing angles. The novel method extends the algorithm to consider a different situation, i.e., reconstructing the wave distribution in a variable tilted plane. Suppose the object wave distribution o(x,y) on the hologram (at the z=0 plane) is already known. For simplicity, reconstruction of the wave distribution on a tilted plane, $x_o$-$y_o$, with its normal in y-z plane is considered, as shown in FIG. 1. The Rayleigh-Sommerfeld diffraction integral gives:

$$E(x_o, y_o, z_o) = \frac{iE_0}{\lambda} \int\int o(x,y) \frac{\exp[ikr(x,y,x_o,y_o)]}{r(x,y,x_o,y_o)} \chi(x,y,x_o,y_o) dx dy, \quad (3)$$

where k is the wave number given by k=2π/λ. $E_0$ is a constant and x(x,y,$x_o$,$y_o$) is the inclination factor, which is approximately unitary under the Fresnel approximation and is omitted from the following equations. The inverse length 1/r can be replaced by 1/$r_o$ and the r(x,y,$x_o$,$y_o$) in the argument of the exponential can be expressed as:

$$r = \sqrt{(z_o - y_o \sin\theta)^2 + (x - x_o)^2 + (y - Y_o \cos\theta)^2}, \quad (4)$$

which can be expanded as a power series of $r_o = (z_o^2 + x_o^2 + y_o^2)^{1/2}$. If only the first two lowest order terms in the expanded series are considered, and a further approximation is introduced, ik(x²+y²)/2$r_o$≈ik(x²+y²)/2$z_o$, which holds almost the same restriction as the Fresnel condition, Eq. (3) can be finally expressed as:

$$E(\xi, \eta, z_o) = \frac{iE_0}{\lambda r_o} \exp\left[ik\left(r_o - \frac{z_o y_o \sin\theta}{r_o}\right)\right] \times \int\int o(x,y) \exp\left[\frac{ik}{2z_o}(x^2+y^2)\right] \exp[-i2\pi(\xi x + \eta y)] dx dy, \quad (5)$$

with:

$$\xi = \frac{x_o}{\lambda r_o}, \text{ and } \eta = \frac{y_o \cos\theta}{\lambda r_o}. \quad (6)$$

Eq. (5) can be implemented with the fast Fourier transform (FFT) algorithm and a coordinate transform is made to get the wave distribution in the ($x_o$, $y_o$) coordinate as indicated in Eq. (6).

In the discrete implementation of Eq. (5), the resolution of the reconstructed plane is determined according to the Shannon theory, and is given as:

$$\Delta x_o = \frac{\lambda z}{N \Delta x}, \Delta y_o = \frac{\lambda z}{N \Delta y \cos\theta} \quad (7)$$

where $\Delta x_o$ and $\Delta y_o$ are the resolutions of the tilted plane, Δx and Δy are the resolutions of the hologram plane and N×N is the array size of a square area on the CCD. To keep the reconstructed resolution consistent at different z planes, a zero-padding method can be used by simple padding of the recorded hologram with zeros in both the horizontal and vertical directions. Note that if the tilted angle θ is equal to zero, then Eq. (5) simplifies to the well-known Fresnel diffraction formula [B12]. Although the above algorithm only considers the situation that the angle θ lies in the y-z plane, it can easily be extended to any tilted angle θ in space. From the above, the wave fields at an arbitrarily tilted plane can be reconstructed from the holograms, and the tomographic images in WSDIH, synthesized from multiple wave distributions, can be flexibly adjusted to variable orientations.

Figure 17:
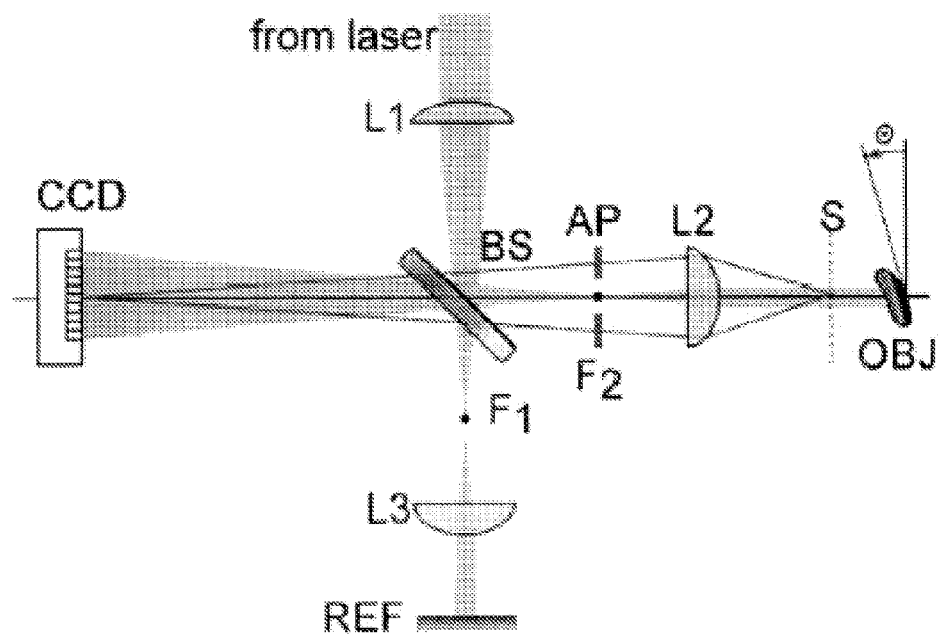
FIG. 17 is a diagrammatic representation of an optical apparatus having utility in digital interference holography applications.

Experiments have been performed to verify the effectiveness of the novel method. FIG. 17 shows the optical setup of the WSDIH system using a Michelson interferometer illuminated by a Coherent 699 ring dye laser, which can be tuned continuously from 567.0 nm to 613.0 nm. Lens L1 provides plane-wave illumination of the object by focusing the input laser at the front focus of L2. Plane S is imaged to the CCD camera by lens L2. Collimating the reference beam with L3 then results in a magnified image at the CCD camera of an interference pattern that would exist at S if the object wave is superposed with a plane wave there. An aperture is placed in the focal plane of L2 to control the size of the object spectrum captured in the CCD camera. REF is a mirror. The object and the reference beams are tilted with respect to each other in an off-axis hologram arrangement. The object angular spectrum can be separated from other spectral components of the hologram with a band-pass filter if the off-axis angle of the incident beam is properly adjusted. Then, the pure object wave distribution o(x,Y) on the hologram plane can be readily extracted by taking an inverse Fourier transform of the object spectrum.

Figures 18A, 18B, 18C, 18D:
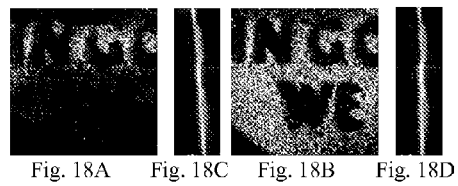
FIG. 18A is a contour image of a dime with normal tomographic scanning by the Fresnel diffraction formula.
FIG. 18B is a contour image of a dime with tilted tomographic scanning by the novel algorithm.
FIG. 18C is a cross-sectional view of the FIG. 18A image.
FIG. 18D is a cross-sectional view of the FIG. 18B image.

In an experiment, the WSDIH system images a surface area of a dime, 2.25×2.25 mm2, 256×256 pixels, which is slightly tilted with a small angle θ=3° to the hologram plane, as shown in FIG. 17. The reconstruction distance z, representing the distance from the object to S plane in FIG. 17 is set to 35 mm. The wavelengths of the dye laser are scanned for a range of 575.0 to 585.0 nm at 20 values (19 equal increments of 1/λ), which gives an axial range of Λ=639 μm and axial resolution of δ=32 μm. The lateral resolution is the same as the reconstruction resolution defined in Eq. (7) and is about 9 μm×9 μm in the experiment. For comparison, the Fresnel diffraction formula is used first to reconstruct the wave fields for scanning direction normal to the hologram plane. The wave distributions from all the holograms are numerically superposed together to obtain the accumulated field distribution that represents the three dimensional object structure. FIGS. 18A-D provide an animation of scanning a sequence of contour images at different layers of the object at 15 μm axial distance intervals. Since the coin is slightly tilted relative to the hologram plane, the contour images sequentially appear from bottom to top in FIG. 18A as the distance z is increased. The scanning planes can be selectively adjusted by using the reconstruction algorithm disclosed above, and they are now set parallel to the base surface of the coin, so that the features of the relief appear simultaneously in a single tomographic scanning. Specifically, the tilted angle of the reconstruction plane is set to θ=3°, as shown in FIG. 16. FIG. 18B shows a demo of tilted tomographic scanning that the letters on the coin are now either all highlighted or all darkened, for they are located in the same scanning plane. FIG. 18C is the flat view of all the yo-z cross sections from 18A, which clearly shows a tilted angle between the coin base surface and the scanning plane. Similarly, the yo-z flat view for the tilted tomographic scanning is shown in FIG. 18D, the scanning plane is now parallel to coin base surface and shown vertical in the figure.

Figures 19A, 19B:
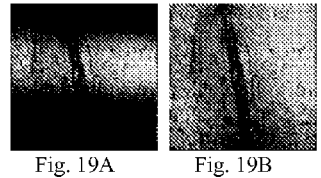
FIG. 19A is a contour image of a chick embryo with normal tomographic scanning by the Fresnel diffraction formula.
FIG. 19B is a contour image of said chick embryo with tilted tomographic scanning by the novel algorithm.

FIGS. 19A and B shows another example of a prepared slide of a chick embryo, of area 2.26×2.26 mm2, QuickTime, 1.12 MB. The embryonic blood vessel is located in a tilted plane with θ=2.5°. FIG. 19A shows the tomographic images with normal scanning with the Fresnel diffraction formula. If the scanning plane is intentionally tilted with a proper angle of θ=2.5° however, the whole blood vessel is reconstructed at one tomographic image as shown in FIG. 19B. This animation shows tilted tomographic scanning with the novel algorithm.

The acquisition time is limited by the need to manually scan the laser wavelength. However, such limitation is overcome by replacing the manual scan with a motorized micrometer under computer control. The limiting factor then becomes the camera frame rate. The sensitivity of the novel detection system is approximately 60 dB without image accumulation or lock-in. As in the case of full-field OCT, the sensitivity of the WSDIH system is mainly limited by the electronic noise of the camera and the dynamic range of the CCD sensor. The sensitivity can be greatly improved by using a CCD camera with higher dynamic range or incorporating binning or image lock-in techniques.

The above experiment clearly shows that variable tomographic scanning is possible in WSDIH, given that the holograms contain all the information of the three-dimensional object that is necessary for numerical reconstruction. By reconstructing the wave distribution in an arbitrarily tilted plane, which functions as the scanning plane in WSDIH, the tomographic image can be reconstructed accordingly. Although the examples presented only show the surface profile of a dime or other thin object, the capability of WSDIH to generate cross-sectional views of sub-surface structure has been experimentally demonstrated. This novel technique will be very useful for acquiring images of randomly orientated features of a specimen in a WSDIH system.

Resolution Control by Use of a Transition Plane

The Fresnel diffraction formula (FDF) is commonly used for numerical reconstruction in digital holography when the distance from the hologram to the object is large relative to the size of the hologram or the object, which is called the Fresnel approximate condition. Except for this condition, the FDF is also subject to a minimum object-to-hologram distance limitation, otherwise aliasing will occur in the numerical implementation of the Fourier transform in the diffraction integral. The reconstruction resolution from the FDF will increase proportionally as a function of the reconstruction distance. To reconstruct the wave field for smaller object-to-hologram distance, the FDF can be implemented as a convolution and the reconstruction resolution will keep the same as the hologram plane. However, the convolution method does not work for large distances. The angular spectrum method is used for numerical reconstruction as well and it can reconstruct the wave field either close to or far away from the hologram. Similar to the convolution method, the reconstructed pixel resolution of the angular spectrum method will keep the same as the hologram plane, thus it is difficult to use it to compare wave fields from multiple cameras with different pixel resolutions.

It is extremely important to control the reconstruction resolution in numerical reconstruction. As in applications such as automatic focus and deformation tracking, multicolor digital holography for color representation, wavelength-scanning digital interference holography for tomographic imaging, or phase ambiguity extension by multi-wavelength digital holography, the wave field (amplitude or phase maps) at different positions or from different wavelengths needs to be compared, combined or superposed. The reconstructed images were subsequently resized in some earlier studies. However, a method to analytically adjust the reconstructed resolution would be very helpful. The zero padding method may be employed to control the resolution for the Fresnel diffraction formula by simple padding of the recorded hologram with zeros in both the horizontal and vertical directions. The new resolution is decreased by adding more zeros to increase the total pixel number. The computation load for this method depends on the total pixel number after padding. For example, to compare the wave field from a square hologram of N2 pixel number at two different positions z1 and z2 (<z2), the wave field at z1 is calculated by padding the hologram into a $N^2(z_2/z_1)^2$ matrix. The computation load will be heavy if the total pixel number after padding is large compared to the original pixel number. Furthermore, this method cannot be used to adjust the pixel resolution if the reconstruction distance is smaller than the minimum object-to-hologram distance.

The novel method includes an alternative approach to control the reconstruction resolution without being subject to the minimum object-to-hologram distance limitation, and the computation load will remain consistent during the process. This is made possible by introducing a transitional plane for numerical reconstruction and coupling the angular spectrum method with the Fresnel diffraction formula. The wave field is first reconstructed in an intentionally introduced transitional plane by use of the angular spectrum method, which provides a consistent reconstruction resolution as the hologram plane. Then the wave distribution on the destination plane is reconstructed by the FDF method. The reconstruction resolution can be easily controlled by adjusting the position of the transitional plane.

Since the object wave distribution on the hologram plane can be easily extracted from the hologram either by a Fourier transform method for off-axis holography or a phase-shift method for in-line holography, the object wave distribution $o(x,y)$ on the hologram (at the z=0 plane) is already known. The wave field on a destination plane $(x_o, y_o)$ can be calculated by the well-known Fresnel diffraction formula:

$$E(x_o, y_o, z_o) = \frac{iE_0}{\lambda z_o} \exp\left[\frac{i\pi}{\lambda z_o}(x_o^2 + y_o^2)\right] \quad (1)$$
$$\iint o(x,y) \exp\left[\frac{i\pi}{\lambda z_o}(x^2+y^2)\right] \exp\left[-\frac{i2\pi}{\lambda z_o}(x_o x + y_o y)\right] dx\,dy.$$

if the distance from the hologram to the object is large relative to the size of the hologram or the object, which is called the Fresnel approximate condition. Eq. (1) can be implemented with the fast Fourier transform (FFT) algorithm and in its discrete implementation, the resolution of the reconstructed plane is determined as:

$$\Delta x_o = \frac{\lambda z}{N \Delta x}, \quad (6)$$

where $\Delta x_o$ is the resolution of the destination plane, $\Delta x$ is the resolution of the hologram plane and N×N is the array size of a square area on CCD. In particular, if the reconstructed resolution $\Delta x_o < \Delta x$, aliasing will happen during the numerical implementation. To avoid aliasing in the Fourier transform, the reconstruction distance:

$$z \geq \frac{N(\Delta x)^2}{\lambda} = z_{min}, \quad (7)$$

which sets the minimum object-to-hologram distance $z_{min}$. Specifically, if the reconstruction distance is set equal to $z_{min}$ the reconstructed pixel resolution is the same as the hologram plane.

Figures 20A, 20B:
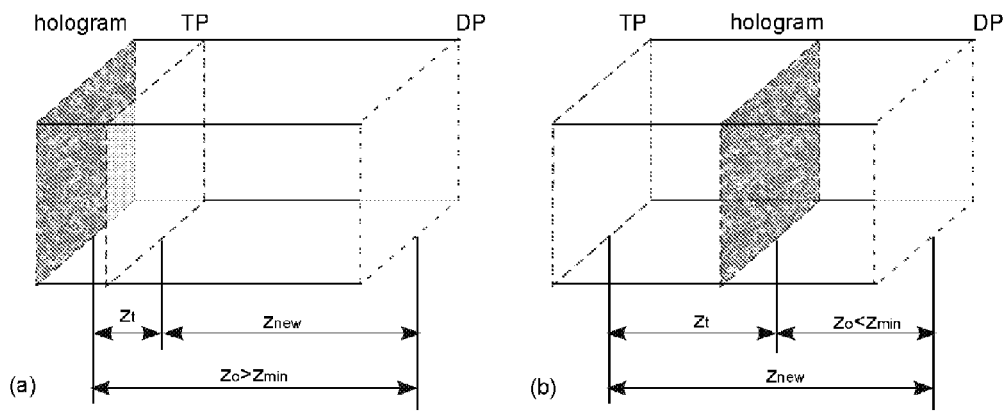
FIG. 20A is a diagrammatic representation of resolution control obtained by introducing a transitional reconstruction plane, located between the hologram and destination planes.
FIG. 20B is a diagrammatic representation of resolution control obtained by introducing a transitional reconstruction plane, located on the opposite side of the destination plane from the hologram plane.

As depicted in FIG. 20A, the distance from the destination plane (object plane) to the hologram $z_o$ is larger than $z_{min}$. In said FIG. 20A, "TP" is transitional plane and "DP" is destination plane. In FIG. 20A, zo>zmin. To control the reconstructed pixel resolution, two steps are needed. First, a transitional reconstruction plane is intentionally introduced in the positive z direction, where the hologram plane is assumed to be at z=0 plane. The wave field on the transitional plane is reconstructed by the angular spectrum method, which shows great advantage to reconstruct the wave field at any distance from the hologram plane, even down to zero distance. From Fourier optics, if the object wave field at plane Z=0, $o(x,y; 0)$ is known, the corresponding angular spectrum of the object wave at this plane can be obtained by taking the Fourier transform:

$$S(k_x, k_y; 0) = \iint o(x,y; 0) \exp[-i(k_x x + k_y y)] dx\,dy, \quad (8)$$

where $k_x$ and $k_y$ are corresponding spatial frequencies of x and y. After propagating along the z axis to a new plane, the new angular spectrum, $S(k_x, k_y; z_t)$, at plane $z_t$ can be calculated from $S(k_x, k_y; 0)$ as:

$$S(k_x, k_y; z_t) = S(k_x, k_y; 0) \exp[ik_z z_t]. \quad (9)$$

where $k_z = [k^2 - k_x^2 - k_y^2]^{1/2}$, $k = 2\pi/\lambda$ and $(k_x, k_y, k_z)$ represents the wave vector of each plane-wave component in the object wave. Thus the complex field distribution of any plane perpendicular to the propagating z axis can be calculated from Fourier theory as:

$$o(x,y; z_t) = \iint S(k_x, k_y; z_t) \exp[i(k_x x + k_y y)] dk_x\,dk_y. \quad (10)$$

The resolution of the reconstructed transitional plane from the angular spectrum method, $\Delta x_t$, is the same as that in the hologram plane $\Delta x$.

Second, the wave distribution in the destination plane is reconstructed by propagating the wave field directly from the transitional plane according to Eq. (5) of TFDF. Note that the distance $z_t$ has to be properly selected so that the new distance from the transitional plane to the destination tilted plane $z_{new} = z_o - z_t$ is still greater than or equal to $z_{min}$, and the pixel resolution:

$$\Delta x_o = \frac{\lambda(z_o - z_t)}{N \Delta x}, \quad (11)$$

can be easily adjusted by selecting a proper $z_t$ for the transitional plane.

If the distance from the destination tilted plane (object plane) to the hologram $z_o$ is smaller than $z_{min}$, as shown in FIG. 20B, the FDF can not be directly used for wave field reconstruction and the zero padding method can not be used to adjust the reconstructed pixel resolution. Nor can pixel resolution be adjusted from the convolution method or the angular spectrum method. However, by introducing a transitional plane in the negative z direction, any resolution $\Delta x_o \geq \Delta x$ can be adjusted, if the position of the transitional plane is properly selected so that a new distance from the transitional plane to the destination plane $z_{new} = z_o - z_t$ is greater than or equal to $z_{min}$.

Wavelength Scanning Digital Interference Holography for Variable Tomographic Scanning A novel technique of variable tomographic scanning is capable of reconstructing tomographic images of an object volume along any arbitrarily tilted plane. The method is based on wavelength scanning digital interference holography, using a series of holograms generated with a range of scanned wavelengths. From each hologram, the object field is reconstructed in a number of selected tilted planes. The desired tomographic images are then reconstructed from the numerical superposition of the object fields. Thus the tomographic images can be generated along variable planes without the need for physically repeating the scanning and recording processes.

Three-dimensional microscopic imaging that reveals the tomographic structure of biological tissues or other materials has a variety of applications in clinical and laboratory studies. Recently developed optical coherence tomography (OCT) is a scanning microscopic technique that is suitable for high-resolution cross-sectional imaging, which uses a Michelson-Type interferometer and is designed to detect a heterodyne signal in the interference of the back-scattered light from the sample point and the reference mirror. The three-dimensional image is reconstructed by scanning the three dimensions pixel by pixel. Its axial and lateral resolutions are determined by the source coherence length and the numerical aperture of the sampling lens, respectively. Since parallel acquisition of two-dimensional images while maintaining the optical sectioning characteristics of OCT would have obvious attractions, full-field OCT techniques have also been reported to acquire the two-dimensional tomographic images. A related technique, short-coherence digital holography is used for three-dimensional microscopic investigations, where a short-coherence laser is used as the light source to record the holograms on a CCD sensor. The image of the part of the sample that matches the reference mirror distance within the coherence length is reconstructed by numerical evaluation of the hologram. The 3D microscopic structure of a specimen can be successfully reconstructed by scanning a reference mirror with a fixed orientation. Another 3D microscopy and tomographic imaging system is wavelength-scanning digital interference holography (WSDIH) where a series of holograms are recorded using a range of scanned wavelengths. The image volume is calculated from each of the holograms and all such image volumes are numerically superposed to create the 3D tomographic image. The process results in a synthesized short coherence length and corresponding axial resolution. The plane on which the reference mirror is located is called the scanning plane and its normal direction is defined as the scanning direction in this disclosure.

In most of the 3D microscopy systems including OCT and WSDIH, the 3D volume is reconstructed as a set of scanning planes with the scanning direction along the optical axis of the system. If a tomographic image on a plane not parallel to the original reference mirror is required, it can be reconstructed by combining or interpolating points from different tomographic layers. However, the quality will be degraded especially when the lateral resolution does not match well with the axial resolution. To get better results, the whole process is physically repeated with the reference mirror tilted or the object rotated to a desired orientation.

The novel method of this invention includes the steps of performing variable tomographic scanning with flexible selection of scanning planes without physically repeating the scanning or recording process. The novel method is based on the principle of wavelength scanning digital interference holography. Tomographic images are obtained with a fixed scanning direction parallel to the optical axis of the system. In digital holography, a single hologram advantageously records the entire three-dimensional information of the object, the object wave distributions and the synthesized tomographic image at an arbitrarily tilted plane so that the image can be reconstructed rigorously, and selective tomographic scanning with different orientation is possible. This tilted reconstruction plane then functions as the scanning plane in the WSDIH.

An extended object is illuminated by a laser beam of wavelength $\lambda$. The scattered wave from any point P of the object (at rp) can be viewed as a Huygens wavelet, so that the resultant field E (r) at r is:

$$E(r) \sim \int A(r_P) \exp(ik|r-r_P|) d^3 r_P. \quad (1)$$

where A(rp) is proportional to the amplitude and phase of a wavelet scattered from the point rp, and the integral is over the object volume. Here we have neglected the 1/r wavelet amplitude dependence as approximately constant over rp. The amplitude and phase of this field at the hologram plane z=0 is recorded by the hologram. If the holographic process is repeated using a range of scanned wavelengths, and the reconstructed fields are all superposed together, then the resultant field is:

$$E(r) \sim \sum_k \int A(r_P) \exp(ik|r-r_P|) d^3 r_P \sim \int A(r_P) \delta(r-r_P) d^3 r_P \sim A(r), \quad (2)$$

which is proportional to the field at the object and is nonzero only at the object points. In practice, if a finite number N of wavelengths is used at regular intervals of $\Delta(1/\lambda)$, then the object image A (r) repeats itself (other than the diffraction/defocusing effect of propagation) at a beat wavelength $\Lambda=[(1/\lambda)]-1$, with axial resolution $\delta=\Lambda/N$. By use of appropriate values of $\Delta(1/\lambda)$ and N, the beat wavelength $\Lambda$ can be matched to the axial extent of the object, and $\delta$ to the desired level of axial resolution.

Diffraction from a tilted plane based on the Rayleigh-Sommerfeld diffraction formula was previously studied for computer-generated holograms by D. Leseberg et al, and was later applied for numerical reconstruction of digital holography with changing viewing angles. In this disclosure, we extend the algorithm to consider a different situation, i.e., reconstructing the wave distribution in a variable tilted plane. Suppose the object wave distribution o(x,y) on the hologram (at the z=0 plane) is already known. For simplicity, reconstruction of the wave distribution on a tilted plane, x0-y0, with its normal in the y-z plane is considered, as shown in FIG. 16. The Rayleigh-Sommerfeld diffraction integral gives:

$$E(x_o, y_o, z_o) = \frac{iE_0}{\lambda} \int \int o(x,y) \frac{\exp[ikr(x,y,x_o,y_o)]}{r(x,y,x_o,y_o)} \chi(x,y,x_o,y_o) dx dy, \quad (3)$$

where k is the wave number given by $k=2\pi/\lambda$. E0 is a constant and X (x, y, x0, y0) is the inclination factor, which is approximately unitary under the Fresnel approximation and is omitted from the following equations. The inverse length 1/r can be replaced by 1/r0 and the r(x, y, x0, y0) in the argument of the exponential can be expressed as:

$$r = \sqrt{(z_o - y_o \sin\theta)^2 + (x-x_o)^2 + (y-Y_o \cos\theta)^2}, \quad (4)$$

which can be expanded as a power series of $r0=(zo2+xo2-y02)^{1/2}$. If only the first two lowest order terms in the expanded series are considered, and a further approximation is introduced, $ik(x2+y2)/2r0=ik(x2+y2)/2zo$, which holds almost the same restriction as the Fresnel condition, Eq. (3) can be expressed as:

$$E(\xi, \eta, z_o) = \frac{iE_0}{\lambda r_o} \exp\left[ik\left(r_o - \frac{z_o y_o \sin\theta}{r_o}\right)\right] \times \quad (5)$$
$$\iint o(x, y) \exp\left[\frac{ik}{2z_o}(x^2 + y^2)\right] \exp[-i2\pi(\xi x + \eta y)] dx dy,$$

with:

$$\xi = \frac{x_o}{\lambda r_o}, \text{ and } \eta = \frac{y_o \cos\theta}{\lambda r_o}. \quad (6)$$

Equation (5) can be implemented with the fast Fourier transform (FFT) algorithm and a coordinate transform is made to get the wave distribution in the (x0, y0) coordinate as indicated in Eq. (6). In the discrete implementation of Eq. (5), the resolution of the reconstructed plane is determined according to the Shannon theory, and is given approximately as:

$$\Delta x_o = \frac{\lambda z}{N \Delta x}, \Delta y_o = \frac{\lambda z}{N \Delta y \cos\theta} \quad (7)$$

where Δx0 and Δy0 are the resolutions of the tilted plane, Δx and Δy are the resolutions of the hologram plane and N×N is the array size of a square area on the CCD. To keep the reconstructed resolution consistent at different z planes, a zero-padding method can be used by simple padding of the recorded hologram with zeros in both the horizontal and vertical directions. If the tilted angle θ is equal to zero, then Eq. (5) simplifies to the well-known Fresnel diffraction formula. Although the above algorithm only considers the situation where the angle θ lies in the y-z plane, it can easily be extended to any tilted angle θ in space. From the above, the wave fields at an arbitrarily tilted plane can be reconstructed from the holograms, and the tomographic images in WSDIH, synthesized from multiple wave distributions, can be flexibly adjusted to variable orientations.

FIG. 17 shows the optical setup of the novel WSDIH system using a Michelson interferometer illuminated by a Coherent 699 ring dye laser, which can be tuned continuously from 567.0 nm to 613.0 nm. The lens L1 provides plane-wave illumination of the object by focusing the input laser at the front focus of L2. The plane S is imaged to the CCD camera by the lens L2. Collimating the reference beam with L3 then results in a magnified image at the CCD camera of an interference pattern that would exist at S if the object wave is superposed with a plane wave there. An aperture is placed in the focal plane of L2 to control the size of the object spectrum captured in the CCD camera. The object and the reference beams are tilted with respect to each other in an off-axis hologram arrangement. The object angular spectrum can be separated from other spectral components of the hologram with a band-pass filter if the off-axis angle of the incident beam is properly adjusted. Then, the pure object wave distribution o(x, y) on the hologram plane can be readily extracted by taking an inverse Fourier transform of the object spectrum.

In an experimental use of the invention, in which the images of FIGS. 21A-D are obtained, the novel WSDIH system images a surface area of a dime, 2.25×2.25 mm2, 256×256 pixels, which is slightly tilted with a small angle θ=3° to the hologram plane, as shown in FIG. 17. The reconstruction distance z, representing the distance from the object to S plane in FIG. 17 is set to 35 mm. The wavelengths of the dye laser is scanned for a range of 575.0 to 585.0 nm at 20 values (19 equal increments of 1/λ), which gives an axial range of Λ=639 μm and axial resolution of δ=32 μm. The lateral resolution is the same as the reconstruction resolution defined in Eq. (7) and is about 9 μm×9 μm in the experiment. For comparison, the Fresnel Diffraction formula is used first to reconstruct the wave fields for scanning direction normal to the hologram plane. The wave distributions from all the holograms are numerically superposed together to obtain the accumulated field distribution that represents the three dimensional object structure. FIGS. 21A-D provide an animation of scanning a sequence of contour images at different layers of the object at 15 μm axial distance intervals. Since the coin is slightly tilted relative to the hologram plane, the contour images sequentially appear from bottom to top in FIG. 21A as the distance z is increased. The scanning planes can be selectively adjusted by using the reconstruction algorithm disclosed above, and they are set parallel to the base surface of the coin, so that the features of the relief appear simultaneously in a single tomographic scanning.

Figures 21A, 21C:
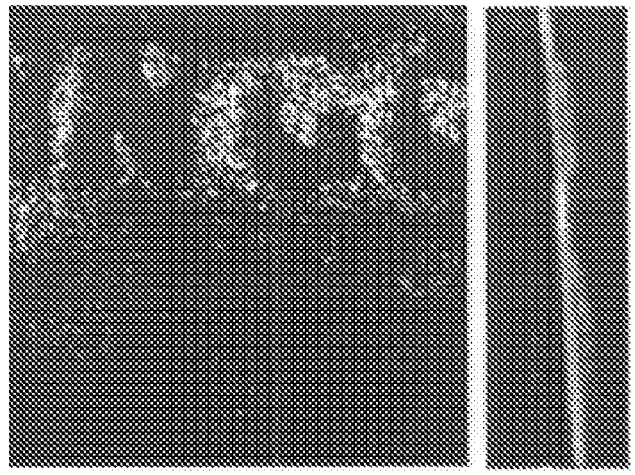
FIG. 21A is a prior art contour image of a dime obtained by normal tomographic scanning by the Fresnel diffraction formula.
FIG. 21C is a cross-sectional view of the FIG. 21A image.
Figures 21B, 21D:
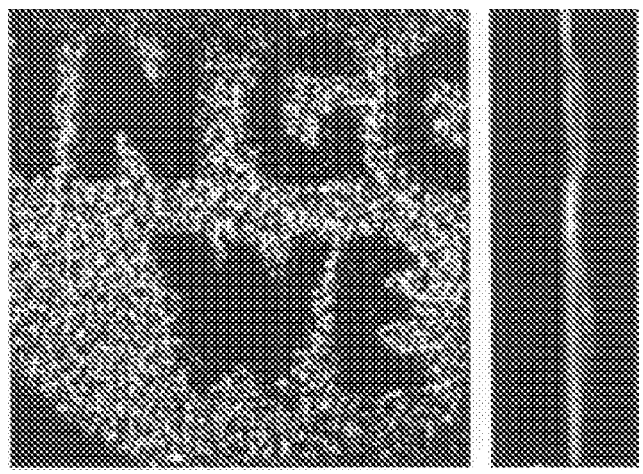
FIG. 21B is a contour image of a dime obtained by tilted tomographic scanning employing the novel algorithm.
FIG. 21D is a cross-sectional view of the FIG. 21B image.

Specifically, in this experiment the tilted angle of the reconstruction plane is set to θ=3°, as shown in FIG. 16. FIG. 21B shows a demo of tilted tomographic scanning where the letters on the coin are now either all highlighted or all darkened, because they are located in the same scanning plane. FIG. 21C is the flat view of all the y0-z cross sections from 21A, which clearly shows a tilted angle between the coin base surface and the scanning plane. Similarly, the y0-z flat view for the tilted tomographic scanning is shown in FIG. 21D, the scanning plane is now parallel to coin base surface and shown vertical in the figure.

Figure 22A:
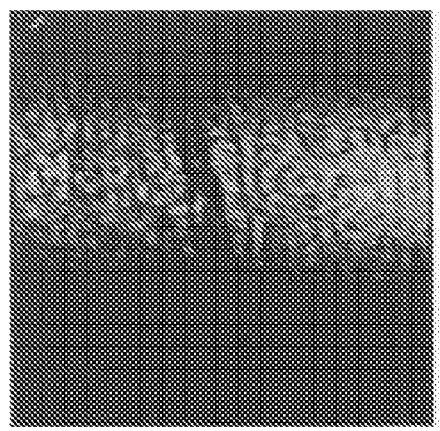
FIG. 22A is a contour image of a chick embryo obtained by normal tomographic scanning by the Fresnel diffraction formula.
Figure 22B:
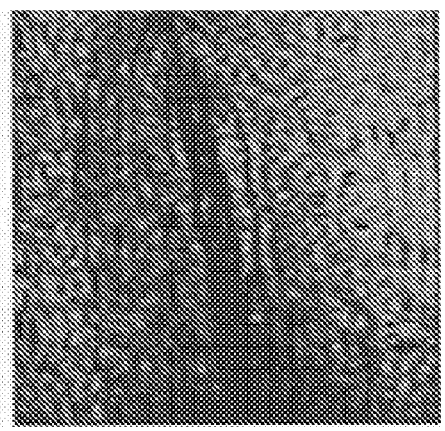
FIG. 22B is contour image of the chick embryo of FIG. 22A obtained by tilted tomographic scanning employing the novel algorithm.

FIG. 22A shows another example of a prepared slide of a chick embryo, of area 2.26×2.26 mm2. The embryonic blood vessel is located in a tilted plane with θ=2.5°. FIG. 22A shows the tomographic images with normal scanning. If the scanning plane is intentionally tilted with a proper angle of θ=2.5° however, the whole blood vessel is reconstructed at one tomographic image as shown in FIG. 22B.

At this stage of development, the need to manually scan the laser wavelength limits the acquisition time, which can be greatly accelerated if a motorized micrometer under computer control is used for scanning. Then the limiting factor will be the camera frame rate. The sensitivity of the novel WSDIH system is mainly limited by the electronic noise of the camera and the dynamic range of the CCD sensor, and is approximately 60 dB in the novel system. The sensitivity can be improved by using a CCD camera with higher dynamic range or incorporating binning or image lock-in techniques.

Although the objects in the experiments are tilted with relatively small angles of θ, the novel algorithm provides good reconstructions for tilted angles θ up to ±60 degrees, according to numerical analysis for this case. Theoretically, the Fresnel approximate conditions will impose a restriction to the extent of the tilted plane, which is related to the tilted angle. Furthermore, a larger tilted angle will induce a larger reconstructed pixel resolution of the tilted plane, as indicated in Eq. (6). Thus tilted angles smaller than 60 degrees are selected for experimental use.

The novel algorithm can be used to better observe interesting structures or features randomly oriented on planes that are not parallel to the original scanning plane. Although the 3D volume can be reconstructed as a set of scanning planes perpendicular to the optical axis, and a tilted tomographic image can be obtained by combining or interpolating points from different tomographic layers, however, the quality of the interpolated image will be greatly degraded if the lateral resolution does not match well with the axial resolution. This disclosure enables a more rigorous calculation of wavefield distributions on a tilted plane directly from the recorded holograms, since the advantage of digital holography is that the holograms have recorded all the information of the object, and the synthesized tilted tomographic images will have better quality than those only from interpolation.

This experiment clearly shows that variable tomographic scanning is possible in WSDIH, given that the holograms contain all the information of the three-dimensional object that is necessary for numerical reconstruction. By reconstructing the wave distribution in an arbitrarily tilted plane, which functions as the scanning plane in WSDIH, the tomographic image can be reconstructed accordingly. Although the examples presented only show the surface profile of a dime or other thin object, the capability of WSDIH to generate cross-sectional views of sub-surface structure has been experimentally demonstrated. This innovation will be very useful for acquiring and observing images of randomly orientated features of a specimen in a WSDIH system.

Wavelength-Scanning Digital Interference Holography for Tomographic 3D Imaging Using the Angular Spectrum Method A tomographic imaging system based on wavelength scanning digital interference holography by applying the angular spectrum method is disclosed. Compared to the well-known Fresnel diffraction formula which is subject to a minimum distance requirement in reconstruction, the novel angular spectrum method reconstructs the wave field at any distance from the hologram plane. The novel system allows extracting three-dimensional tomographic images with improved signal-to-noise ratio, more flexible scanning range and easier specimen size selection.

Imaging techniques that reveal the tomographic structure of biological or material tissues by use of optical radiation has become a subject of increasing interest. Optical coherence tomography (OCT) is an effective interferometric technique that can produce high-resolution cross-sectional images of biological structures. This method is based on the measurement of the interferometric cross correlation of the light backscattered from the sample with the light retroreflected from a reference mirror. The three-dimensional image is reconstructed by scanning the three dimensions pixel by pixel. Although microscanning using piezo actuators is a well-established art, being able to obtain images frame by frame will have significant technical advantages. The wide-field two-dimensional OCT has been developed as a method of acquiring a sequence of full-field interferometric images by illumination with a broadband light source. The regions of the image that contain interferometric information can be extracted by digital processing of the CCD images, thus generating the optical section images. Natural color representation is also possible by analyzing and recombining the interferometric images in three color channels.

In wavelength-scanning digital interference holography (WSDIH), holographic images of an object volume are numerically reconstructed with the well-known Fresnel diffraction formula from a set of holograms recorded using a series of wavelengths. The numerical superposition of all the image volumes result in a synthesized short coherence length and corresponding axial resolution. The Fresnel diffraction formula, however, requires that the distance between the object and the hologram be sufficiently large enough in comparison to the size of the object or the hologram. This is referred to as the Fresnel approximation condition. Although the Fresnel diffraction formula can still give an accurate reconstruction for smooth and slowly varying objects where the Fresnel approximation is not strictly satisfied, it cannot correctly reconstruct near wave fields for more diffractive objects where the higher-order terms in the expansion of the Fresnel approximation are more significant. This places a stringent limit on the scanning range and specimen size and adversely affects the signal-to-noise ratio of the tomographic system as well. A novel technique for overcoming these problems incorporates the use of an angular spectrum method in the novel WSDIH system.

To briefly review the principle of WSDIH, suppose an object is illuminated by a laser beam of wavelength $\lambda$.

A point P (at rp) on the object scatters the illumination beam into a Huygens wavelet, $A(r_P)\exp(ik\,r-r_P)$, where $A(r_P)$ is proportional to the amplitude and phase of the scattered wavelet. For an extended object, the field at r is $$E(r) \sim \int A(r_P) \exp(ik|r-r_P|)d^3r_P. \quad (1)$$

where the integral is over the object volume. The amplitude and phase of this field at the hologram plane z=0 is recorded by the hologram. If the holographic process is repeated using N different wavelengths, and the reconstructed fields are all superposed together, then the resultant field is:

$$E(r) \sim \sum_k \int A(r_P)\exp(ik|r-r_P|)d^3r_P \sim \int A(r_P)\delta(r-r_P)d^2r_P \sim A(r), \quad (2)$$

That is, for a large enough number of wavelengths, the resultant field is proportional to the field at the object and is nonzero only at the object points. In practice, use of a finite number N of wavelengths at regular intervals of $\Delta(1/\lambda)$ causes the object image A(r) to repeat itself (other than the diffraction/defocusing effect of propagation) at a beat wavelength $\Lambda=[\Delta(1/\lambda)]^{-1}$ with axial resolution $\delta=\Lambda/N$. By use of appropriate values of $\Delta(1/\lambda)$ and N, the beat wavelength $\Lambda$ can be matched to the axial extent of the object, and $\delta$ to the desired level of axial resolution.

Figure 23:
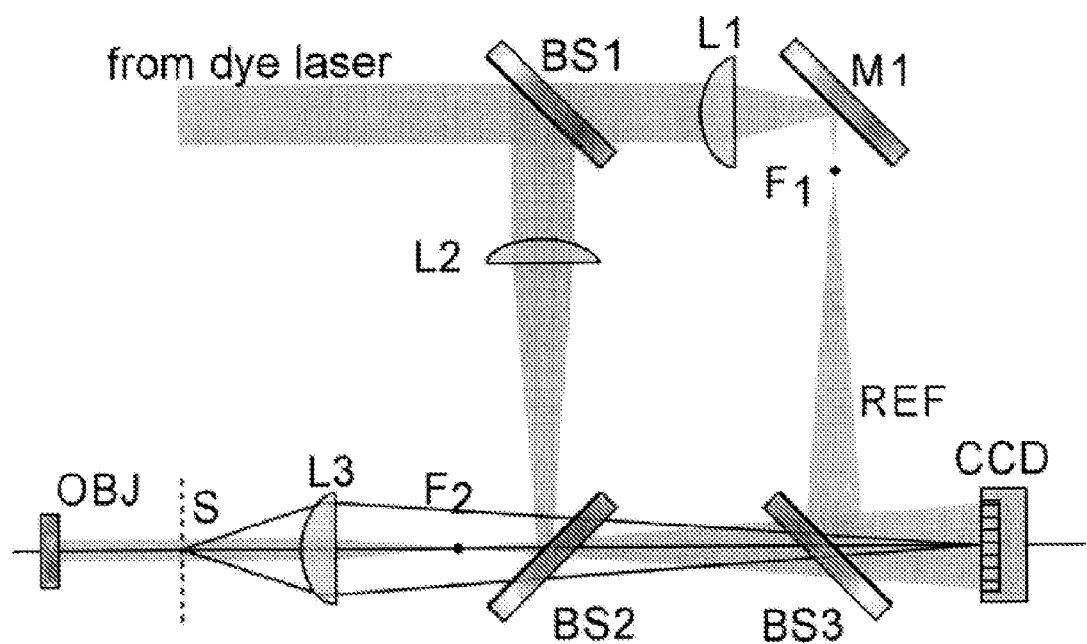
FIG. 23 is a diagrammatic representation of a digital interference holography apparatus.

The design of a WSDIH system is illustrated in FIG. 23, where a modified Mach-Zehnder interferometer apparatus is illuminated by a tunable dye laser. The input laser beam is split at beam splitter BS1 into reference and object beams, and each part is focused by lens L1 or L2 onto the focal point F1 or F2. Point F2 is also the front focus of objective L3, so the object is illuminated with a collimated beam. The light scattered from the object travels through BS2 and BS3 and reaches the CCD camera. The reference beam's focus F1 is equidistant from BS3 as F2, so it is optically equivalent to a collimated beam incident from the left of objective L3. Plane S is imaged by L3 onto the camera, which records a magnified image of the interference pattern of the light scattered from the object onto S, through a distance z and a plane-wave reference wave present at S. The object and the reference beams are tilted with respect to each other in an off-axis hologram arrangement.

In an earlier embodiment of the invention, the Fresnel diffraction formula was used to calculate the wave field along the propagation direction. The resolution of the reconstructed images determined directly from the Fresnel diffraction formula will vary as a function of the reconstruction distance z as $\Delta x_o=\lambda z/(M\Delta x)$, where $\Delta x$ and $\Delta x_o$ are the resolutions of the hologram and the reconstructed image, respectively, and M×M is the array size of a square area on the CCD. To get consistent resolution, the Fresnel diffraction can also be implemented as a convolution. However, both of the above approaches assume the Fresnel approximations which limits the flexibility and the signal-to-noise ratio of the system, as mentioned above. By using the novel angular spectrum algorithm for the novel WSDIH system, however, the problems associated with the Fresnel diffraction formula are solved.

From Fourier optics, if $E(x, y; 0)$ is the object wave field at plane $z=0$, the corresponding angular spectrum of the object wave at this plane can be obtained by taking the Fourier transform:

$$S(k_x,k_y; 0)=\int\int E(x,y; 0)\exp[-i(k_x x+k_y y)]dxdy, \qquad (3)$$

where kx and ky are corresponding spatial frequencies of x and y. The object angular spectrum $S(kx,ky; 0)$ can be separated from other spectral components of the hologram with a band-pass filter if the off-axis angle θ of the incident beam is properly adjusted. The field $E(x, y; O)$ can be rewritten as the inverse Fourier transform of its angular spectrum, $$E(x,y; 0)=\int\int S(k_x,k_y; 0)\exp[i(k_x x+k_y y)]dk_x dk_y. \qquad (4)$$

The complex-exponential function $\exp[i(kxx+kyy)]$ may be regarded as a projection, onto the plane $z=0$, of a plane-wave propagating with a wave vector $(kx,ky,kz)$, where $kz=[(k2-kx2-ky2]^{1/2}$ and $k=2\pi/\lambda$. Thus the field $E(x,y; 0)$ can be viewed as a projection of many plane-wave components propagating in different directions in space, and with complex amplitude of each component equal to $S(kxky; 0)$. After propagating along the z axis to a new plane, the new angular spectrum, $S(kx,ky\ z)$ at plane z can be calculated from $S(kx, ky; 0)$ as $$S(k_x,k_y; z)=S(k_x,k_y; 0)\exp[ik_z z]. \qquad (5)$$

Thus the complex field distribution of any plane perpendicular to the propagating z axis can be calculated from Fourier theory as:

$$E(x,y; z)=\int\int S(k_x,k_y; z) \exp [i(k_x x+k_y y)]dk_x dk_y. \qquad (6)$$

Accordingly, given the complex field at one plane, by calculating its propagation of angular spectrum the complex field distribution at another plane can be found. This is the angular spectrum method and can be used for numerical reconstruction in WSDIH. The resolution of the reconstructed images from the angular spectrum method is the same as that in the hologram plane. In spite of the apparent differences, the angular spectrum method yields the same predictions of diffracted field as the first Rayleigh-Sommerfeld solution. However, as an approximate Rayleigh-Sommerfeld solution, Fresnel diffraction is not capable of reconstructing the wave field near to the hologram plane.

Figure 24A:
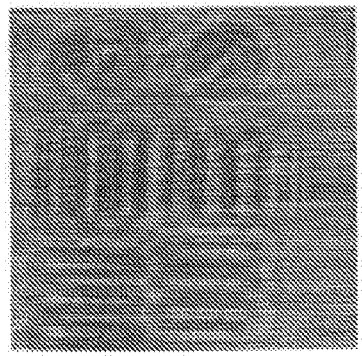
FIG. 24A is a hologram of a resolution target.
Figure 24B:
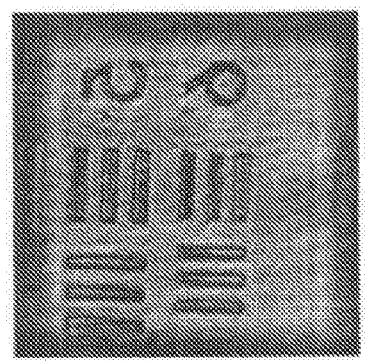
FIG. 24B is a reconstruction from the Fresnel diffraction formula.
Figure 24C:
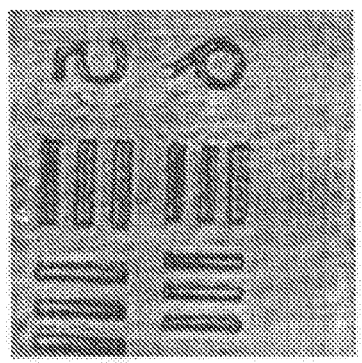
FIG. 24C is a reconstruction from Fresnel convolution.
Figure 24D:
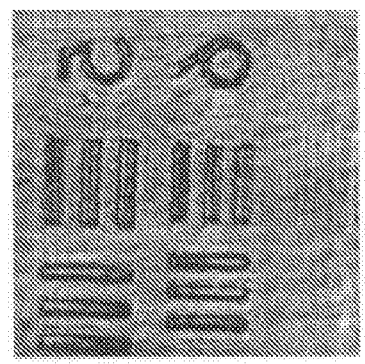
FIG. 24D is a reconstruction from the novel angular spectrum method.

Experiments demonstrate the advantages of using the angular spectrum method for the WSDIH system. 24A shows the hologram of a USAF-1951 resolution target with area 1.535×1.535 mm2, 256×256 pixels. The distance z representing the distance from the object to hologram plane (S plane in FIG. 23) is 18 mm. The wavelength of the dye laser is 594 nm. The reconstructed resolution determined directly from the Fresnel diffraction formula is given by $\Delta x0=\lambda z/M\Delta x=7$ μm, which is slightly larger than the resolution of the hologram at $\Delta x=6$ μm. Thus the reconstructed image (only amplitude is shown) is seen to be smaller in FIG. 24B. However, reconstruction from either Fresnel convolution or the angular spectrum method has the same resolution as the hologram plane, as shown in FIGS. 24C and 24D. Although the Fresnel approximation condition is not strictly satisfied in this example, the Fresnel diffraction can still give fairly accurate reconstruction. This is because the resolution target is a relatively smooth and slowly varying object, with the major contribution to the wave field at the reconstructed point (x0, y0) coming from points (x,y) for which x≈x0 and y≈y0 on the hologram. Thus the particular values of the higher-order terms in the expansion of the Fresnel approximation are unimportant. These higher-order terms however will be extremely important for a more diffractive object, which is most often the case for a WSDIH system in biological tomographic applications.

Figure 25A:
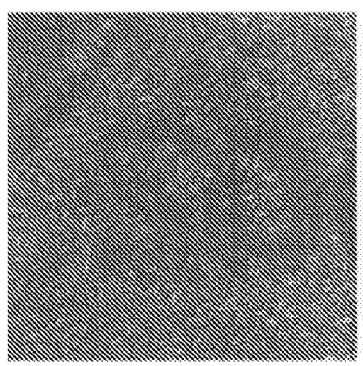
FIG. 25A is a hologram of a penny.
Figure 25B:
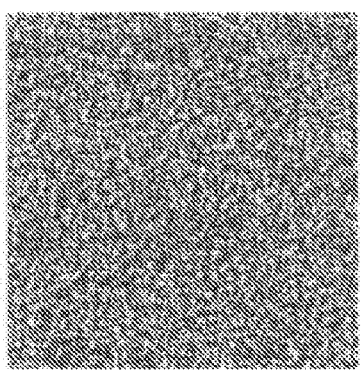
FIG. 25B is a reconstruction from Fresnel convolution.
Figure 25C:
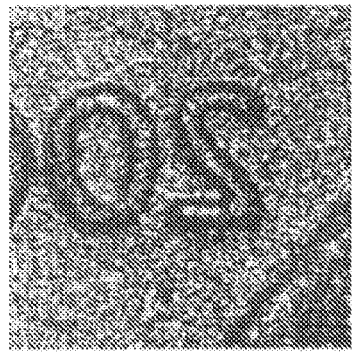
FIG. 25C is a reconstruction from the novel angular spectrum method.
Figure 26A:
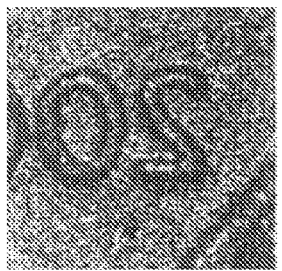
FIG. 26A is the first holographic image of a coin in a series of five (5) images built up of axial resolution by superposition of holographic images with one (1), two (2), four (4), eight (8), and twenty (20) wavelengths.
Figure 26B:
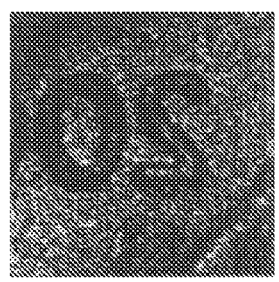
FIG. 26B is the second holographic image in said series.
Figure 26C:
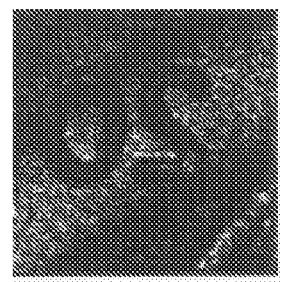
FIG. 26C is the third holographic image in said series.
Figure 26D:
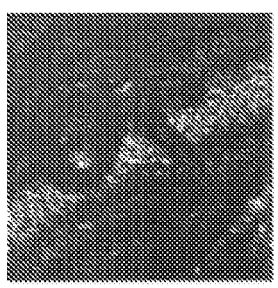
FIG. 26D is the fourth holographic image in said series.
Figure 26E:
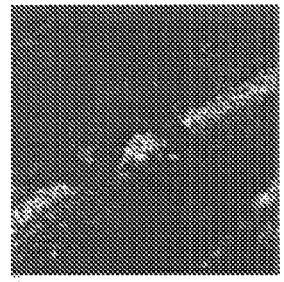
FIG. 26E is the fifth holographic image in said series.
Figure 26F:
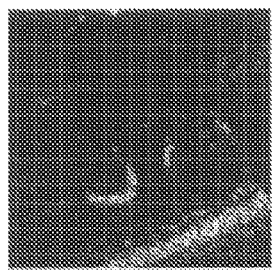
FIG. 26F is a contour image of the same coin at a first axial distance.
Figure 26G:
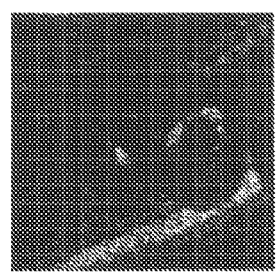
FIG. 26G is a contour image of the same coin at a second axial distance.
Figure 26H:
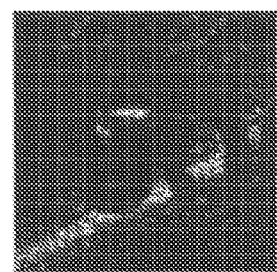
FIG. 26H is a contour image of the same coin at a third axial distance.
Figure 26I:
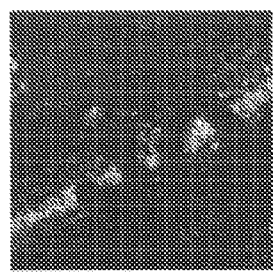
FIG. 26I is a contour image of the same coin at a fourth axial distance.
Figure 26J:
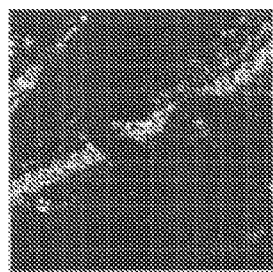
FIG. 26J is a contour image of the same coin at a fifth axial distance.

The following demonstrates the use of the novel WSDIH system in scanning a diffuse penny of area 2.62×2.62 mm2. The reconstruction distance z is 3.9 mm. To achieve the tomographic images, the wavelength of the dye laser is scanned within the range of 575.0-605.0 nm in twenty (20) steps, which gives an axial range of $\Lambda=220$ μm and axial resolution of $\delta=0.12$ μm. FIG. 25A shows the first hologram recorded with $\lambda=575.0$ nm and FIGS. 25B and 25C show the reconstructed amplitude from both the Fresnel convolution and angular spectrum method, respectively. The results clearly show the significant advantage of the angular spectrum method in calculating wave fields near the hologram plane. In WSDIH, the optical field of a volume around the image location is calculated by the angular spectrum method for each wavelength. The twenty 3D arrays are numerically superposed together, resulting in the accumulated field distribution that represents the three dimensional object structure. FIGS. 26A-E illustrate the building up of axial resolution as a series of holographic images are superposed using a range of wavelengths. The contour widths become more narrow as the synthesized coherence length shortens. FIGS. 26F-J show a few contour images at different axial distances.

In conclusion, it has been disclosed that by incorporating the angular spectrum method for WSDIH, wave fields near the hologram plane can be accurately reconstructed for diffractive objects. Consequently, the tomographic system achieves a more flexible scanning range, improved signal-to-noise ratio and more manageable specimen size selection. The experiments presented above demonstrate that such three-dimensional tomographic images are obtained without the need for pixel-by-pixel scanning of the object volume, with significant improvements in the image acquisition speed and therefore also in the range of potential applications.

In a more developed version of the foregoing, a novel method for variable tomographic scanning based on the wavelength scanning digital interference holography (WSDIH) includes the steps of generating a series of holograms with a range of scanned wavelengths. The object field is reconstructed in a number of selected tilted planes from each hologram, and the numerical superposition of all the tilted object fields results in a variable tomographic scanning. The scanning direction can be arbitrary angles in 3D space but not limited in a 2D plane. An algorithm offers more flexibility for acquiring and observing randomly orientated features of a specimen in a WSDIH system.

In contrast to conventional microscopy where the image of an in-focus plane is superposed with blurred images of out-of-focus planes, three-dimensional microscopy that reveals the tomographic structure of the sample has found many applications in biological and materials science. Optical coherence tomography (OCT) is a scanning microscopic technique that is suitable for high-resolution cross-sectional imaging. The basis of OCT is to detect the light scattered from an object that is illuminated by a light source of low temporal but high spatial coherence, and the three dimensional image is reconstructed by scanning the sample area or volume pixel by pixel. Its axial resolution is determined by the source coherence length and its lateral resolution is determined by the numerical aperture of the sampling lens. Full-field two-dimensional OCT has also been reported as a technique to acquire two-dimensional tomographic images while maintaining the optical sectioning characteristics of OCT. With the illumination of a broadband light source, the regions of the image that contain interferometric information can be extracted by digital processing of the CCD images, thus generating two-dimensional optical section images. Wavelength scanning digital interference holography (WSDIH) is another 3D microscopy and tomographic imaging technique under development. By recording a series of holograms using a range of scanned wavelengths, and superposing image volumes from each of the holograms together, a synthesized short coherence length and corresponding axial resolution is obtained.

The tomographic images reported in the above 3D microscopy systems are obtained with a fixed scanning direction parallel to the optical axis of the system. If an interesting feature is located on a plane not parallel to the scanning plane, it must be reconstructed by combining or interpolating points from different tomographic layers. However, if the lateral resolution does not match well with the axial resolution, the quality of the interpolated image is greatly degraded. As in the above WSDIH system, the axial resolution is determined by the wavelength scanning range of the dye laser system and normally is on the order of ~10 μm. However, the lateral resolution can be much higher if microscopic objectives with high magnification are used in the optical system.

One approach to solve this problem is to physically repeat the entire procedure either with the reference mirror tilted or the object rotated to a desired orientation. However, this is time-consuming and cumbersome. A preferred, novel approach is called variable tomographic scanning based on WSDIH. Since the advantage of digital holography is that a single hologram records the entire three-dimensional information of the object, it is possible to calculate more rigorous wavefield distributions directly on the tilted planes from the recorded holograms. The synthesized tilted tomographic images will have better quality than those derived from interpolation. In this way, flexible selection and accurate reconstruction of scanning planes are possible, and the whole process can be fulfilled without physically tilting the object and recording the holograms again. However, only scanning directions within a 2D plane were feasible, and the selection of the reconstruction planes was limited in space, thereby imposing restrictions upon the applications of variable tomographic scanning. The novel method overcomes these limitations. The method includes the step of providing an algorithm to reconstruct wavefields on planes that are arbitrarily tilted in 3D space. It therefore provides more flexibility in acquiring and observing images of randomly orientated features of a specimen in a WSDIH system.

A brief review of the principle of wavelength scanning digital interference holography follows. If a laser beam of wavelength λ is used to illuminate a volume object, any point P on the object at rP scatters the incident beam into a Huygens wavelet A(rP), so that the resultant field E(r) at r is $$E(r) \sim \int A(r_P) \exp(ik|r-r_P|)d^3r_P, \quad (1)$$

where the integral is over the whole object volume. A digital camera is used to record a hologram. It contains both the amplitude and phase information of the object, and can be used to reconstruct its wave propagation at different positions. If the holographic process is repeated using N different wavelengths, and the reconstructed fields are all superposed together, then the resultant field is $$E(r) \sim \sum_k \int A(r_P)\exp(ik|r-r_P|)d^3r_P \sim \int A(r_P)\delta(r-r_P)d^3r_P \sim A(r), \quad (2)$$

which is proportional to the field at the object and is nonzero only at the object points. In practice, if one uses a finite number N of wavelengths at regular intervals of $\Delta(1/\lambda)$, then other than the diffraction or defocusing effect of propagation, the object image A(r) repeats itself at a beat wavelength $\Lambda=[\Delta(1/\lambda)]-1$, with axial resolution $\delta=\Lambda/N$ By use of appropriate values of $\Delta(1/\lambda)$ and N, the beat wavelength $\Lambda$ can be matched to the axial extent of the object, and $\delta$ to the desired level of axial resolution.

Referring now to variable tomographic scanning in 3D space, the following disclosure relates how to fulfill variable tomographic scanning with scanning directions randomly oriented in 3D space. The Rayleigh-Sommerfeld diffraction formula has been used for numerical reconstruction from tilted holograms, but on fixed reconstruction planes. The novel method uses said formula to reconstruct wave distributions in variable tilted planes. Suppose the object wave distribution o(x,y) is extracted from a hologram. The wave distribution in a variably selected tilted plane can be calculated by the Rayleigh-Sommerfeld diffraction integral as:

$$E(x_o, y_o, z_o) = \frac{iE_0}{\lambda} \int\int o(x, y) \frac{\exp[ikr(x, y, x_o, y_o)]}{r(x, y, x_o, y_o)} \times \chi(x, y, x_o, y_o) dx dy, \quad (3)$$

where k is the wave number given by $k=2\pi/\lambda$, E0 is a constant and z(x,y,xo,yo) is the inclination factor, which is approximately unitary under the Fresnel approximation and is omitted from the following equations. The inverse length 1/r can be replaced by 1/ro.

Figure 27:
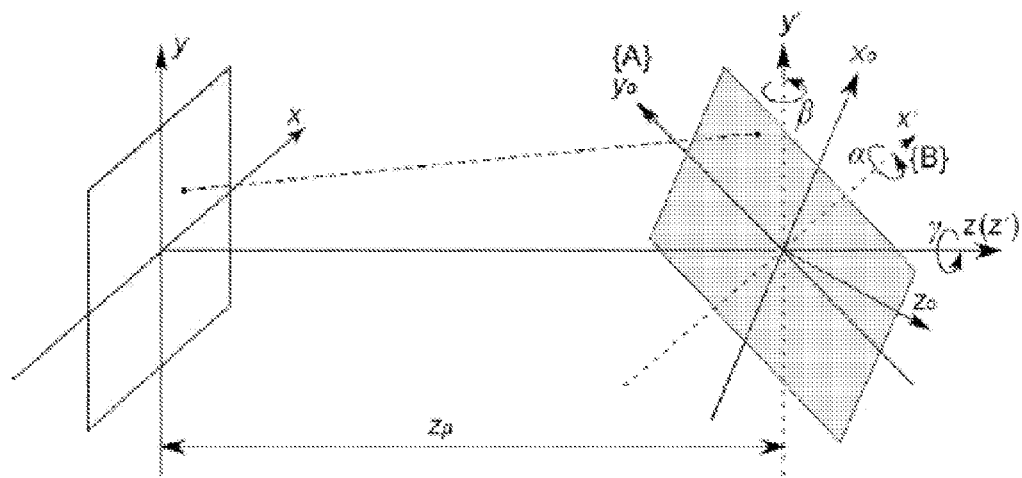
FIG. 27 is a diagrammatic representation of a wavefield reconstruction.

As depicted in FIG. 27, the hologram (x-y plane) is vertically placed in the z=0 plane. The reconstruction plane xo-yo is tilted with its normal direction randomly oriented in space and its origin located at z=zp. The frame xo-yo-zo is defined as Frame {A} in the figure. A new plane x'-y', is now introduced parallel to the hologram plane but sharing the same origin as the xo-yo plane, which defines Frame {B}. Any point [xo,yo, zo] on the xo-yo plane can be transferred to new Frame {B} as:

$$[x',y',z']^T = {}_A^B R \cdot [x_o, y_o, z_o]^T, \quad (4)$$

where the superscript T represents the vector transpose. z0 is set to be zero for all the points on the xo-yo plane since the plane is vertical to the z0 axis and it passes through the origin of {A}.

$${}_A^B R$$

is the transform matrix of Frame {A} relative to Frame {B}, and can be expressed as:

$${}_A^B R = \begin{bmatrix} t_{11} & t_{12} & t_{13} \\ t_{21} & t_{22} & t_{23} \\ t_{31} & t_{32} & t_{33} \end{bmatrix}. \quad (5)$$

For example, if Frame {A} is obtained by rotating Frame {B} about x'-axis by an angle α, then rotating about y' by an angle β, and then rotating about z by an angle γ, the total transform matrix $$\frac{B}{A}$$

R can be expressed as:

$$^B_A R = R_{z'}(\gamma)R_{y'}(\beta)R_{x'}(\alpha) \quad (6)$$

$$= \begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \times$$

$$\begin{bmatrix} 1 & 0 & 0 \\ 0 & \cos\alpha & -\sin\alpha \\ 0 & \sin\alpha & \cos\alpha \end{bmatrix},$$

where Rxi(θ) represents the transfer matrix of a rotation about an axis xi by an amount of θ. The positive directions of the rotation angles around different axes are also shown in FIG. 27. The distance r(x,y, z,xo,yo, zo) between any point (x,y, z) on the hologram plane and a point (xo,yo, zo) on the destination reconstruction plane can be calculated as:

$$r = \sqrt{(z_P + z')^2 + (x - x')^2 + (y - y')^2} \quad (7)$$

$$= \sqrt{x^2 + y^2 + z_P^2 + x'^2 + y'^2 + z'^2 - 2xx' - 2yy' + 2z_P z'}$$

$$= \sqrt{x^2 + y^2 + z_P^2 + x_o^2 + y_o^2 - 2xx' - 2yy' + 2z_P z'},$$

where we have substituted x'2+y'2+z'2 with xo2+yo2, which is obvious from Eq. (4) according to the property of rotation matrix. The above square root can be expanded as a power series of ro=(zp2+xo2+yo2)½. If only the first two lower order terms in the expanded series are considered, then Eq. (7) can be expressed as:

$$r \approx r_o\left(1 + \frac{(x^2 + y^2 - 2xx' - 2yy' + 2z_P z')}{2r_o^2}\right), \quad (8)$$

which is substituted into the Rayleigh-Sommerfeld diffraction integral of Eq. (3). We also substitute x', y' and z' with x and y from Eqs. (4) and (5), and finally we get:

$$E(\xi, \eta, z_0) = \frac{iE_0}{\lambda r_o}\exp\left[ikr + \frac{ik}{r_o}(t_{31}x_o + t_{32}y_o)z_P\right] \times \quad (9)$$

$$\int\int o(x, y)\exp\left[\frac{ik}{2z_o}(x^2 + y^2)\right] \times$$

$$\exp[-i2\pi(\xi x + \eta y)]dxdy,$$

with $$\xi = \frac{(t_{11}x_o + t_{12}y_o)}{\lambda r_o}, \quad (10)$$

$$\eta = \frac{(t_{21}x_o + t_{22}y_o)}{\lambda r_o}. \quad (11)$$

Here we have introduced a further approximation, ik(x2+y2)/2z0, which holds almost the same restriction as the Fresnel condition. This approximation is introduced to simplify the calculation of Eq. (9), so that it can be implemented with the fast Fourier transform (FFT) algorithm. And finally a coordinate transform is made to get the wave distribution in the (xo,yo) coordinate as indicated in Eqs. (10) and (11). In the discrete implementation of Eq. (9), the following relationship exists according to the Shannon theory:

$$t_{11}\Delta x_o + t_{12}\Delta y_o = \frac{\lambda r_o}{N\Delta x}, \text{ and } t_{21}\Delta x_o + t_{22}\Delta y_o = \frac{\lambda r_o}{N\Delta y}, \quad (12)$$

where Δxo and Δyo are the resolutions of the tilted plane, Δx and Δy are the resolutions of the hologram plane and N×N is the array size of a square area on the CCD. The resolution of the reconstructed plane therefore can be analytically calculated from the given Δx and Δy.

If the rotation angles β and γ are both set to be zero in Eq. (6), Eq. (9) can be written as:

$$E(\xi, \eta, z_0) = \frac{iE_0}{\lambda r_o}\exp\left[ik\left(r_o + \frac{z_p y_o \sin\alpha}{r_o}\right)\right] \times \quad (13)$$

$$\int\int o(x, y)\exp\left[\frac{ik}{2r_o}(x^2 + y^2)\right] \times$$

$$\exp\left[-i2\pi\left(\frac{x_o}{\lambda r_o}x + \frac{y_o\cos\alpha}{\lambda r_o}y\right)\right]dxdy,$$

with the resolution of the reconstruction plane as:

$$\Delta x_o = \frac{\lambda z}{N\Delta x} \text{ and } \Delta y_o = \frac{\lambda z}{N\Delta y\cos\theta}, \quad (14)$$

which is obvious from Eq. (12). In this case, the normal direction of the reconstruction plane is located in the y-z plane. If all the rotation angles α,β, and γ are set to zero, Eq. (9) can be further simplified as the well-known Fresnel diffraction formula, where all the reconstruction planes are perpendicular to the optical axis.

Figure 28:
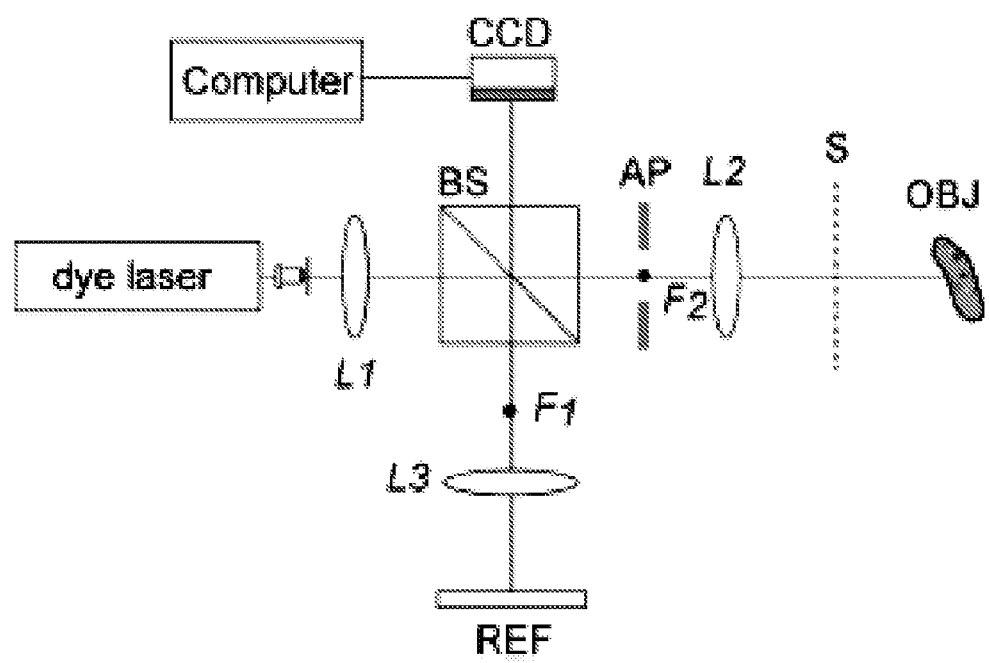
FIG. 28 is a diagrammatic representation of an optical apparatus used in digital interference holography applications.
Figure 29A:
FIG. 29A is the first image of a four image reconstruction of a contour image of a quarter at a first tilted angle.
Figure 29B:
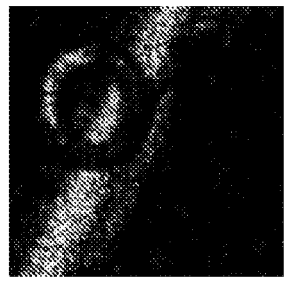
FIG. 29B is the second image of said four images.
Figure 29C:
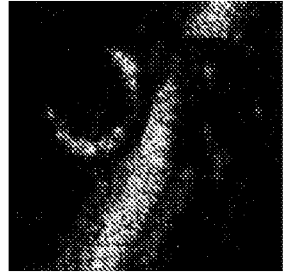
FIG. 29C is the third image of said four images.
Figure 29D:
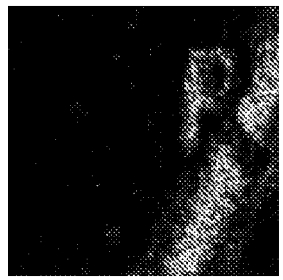
Figure 29E:
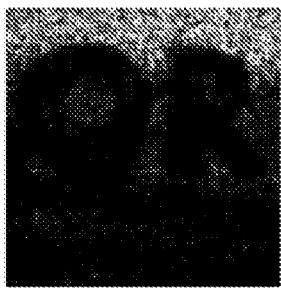
Figure 29F:
Figure 29G:
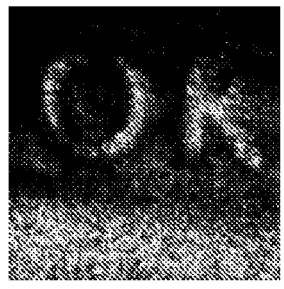
Figure 29H:
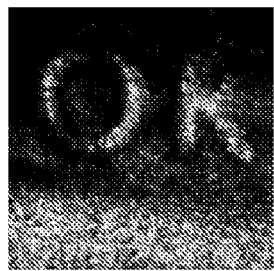
Figure 29I:
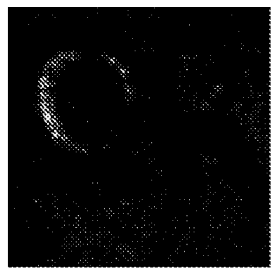
Figure 29J:
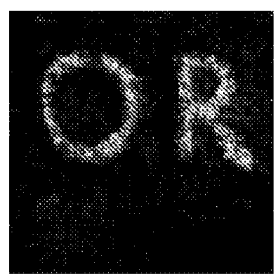
Figure 29K:
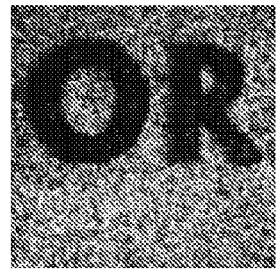
Figure 29L:

The following experiments are disclosed to verify the algorithm disclosed herein for variable tomographic scanning. The optical setup of the experiment is based on a Michelson interferometer, as shown in FIG. 28. A coherent 699 ring dye laser, with a continuously tunable wavelength from 567.0 to 613.0 nm, is used for illumination. The laser beam is split at beam splitter BS into reference and object beams, and each part is focused by lens L1 onto the focal point F1 or F2. Point F2 is also the front focus of objective L2, so the object is illuminated with a collimated beam. The plane S is imaged to the CCD camera by the lens L2. In the reference arm the beam is also collimated by lens L3, which results in a magnified image at the CCD camera of an interference pattern that would exist at S if the object wave is superposed with a plane wave there. An aperture AP is placed in the focal plane of L2 to control the size of the object angular spectrum captured in the CCD camera. An off-axis hologram arrangement is used by slightly tilting the reference mirror REF. For off-axis holography, the object angular spectrum can be separated from other spectral components of the hologram with a band-pass filter if the off-axis angle of the two beams is properly adjusted. Then, the pure object wave distribution o(x,y) on the hologram plane can be readily extracted by taking an inverse Fourier transform of the object spectrum.

The WSDIH system is used to image a tilted 25 cent coin, rotated from x'-y' plane with $\alpha=-4°$, $\beta=7.5°$ and $\gamma=0°$ in space, as shown in FIG. 27. The selected area on the coin surface contains two letters "OR," and has a size of 2.5×2.5 mm2 with 300×300 pixels. The coin can be viewed as an object with two surfaces: the base surface of the coin and the top surface of the letters. The reconstruction distance z, representing the distance from the object to the S plane in FIG. 30 is set to 36 mm. The wavelengths of the dye laser are scanned for a range of 580.0-590.0 nm at 20 values, which gives an axial range of 650 μm and axial resolution of 32 μm.

For comparison, the Fresnel diffraction formula is first used to reconstruct the wave fields for scanning direction normal to the hologram plane. Thus the reconstruction xo-yo planes are all parallel to the hologram plane. The wave distributions from all the holograms are numerically superposed together to obtain the accumulated field distribution that represents the three-dimensional object structure. FIGS. 29A-D show four (4) contour images at different layers of the object at about 60 μm axial distance intervals. Since the coin is tilted relative to the hologram plane in both directions, the contours are all tilted in the images, and they sequentially appear from left top to right bottom in FIGS. 29A-D as the distance z is increased. FIG. 30A is the flat view of all the yo-zo cross-sections from the reconstructed volume and FIG. 30B is the xo-zo flat view. Since the coin is tilted in both directions relative to xo- and yo-axes, so it is not parallel to the scanning planes, and the extended width (or thickness) of the flat views in both figures is easily visible. The algorithm of Eqs. (9)-(11) is used for reconstruction but with $\alpha=0°$, $\beta=0°$ and $\gamma=0°$, and obtained the same results as above, proving the fact that the Fresnel diffraction formula is only a special case of the algorithm herein disclosed.

Using the known orientation of the coin in space, the proper angles may be set for scanning in the algorithm. If $\alpha=0$ and $\beta=7.5°$, then the reconstruction plane is tilted in space, and has a relative 4° angle to the coin surface around the xo-axis. FIGS. 29E-H show another four contour images, which sequentially appear from top to bottom as the distance z is increased. The yo-zo flat view in FIG. 30C shrinks to two relatively thin lines that represent the two surfaces of the coin. This reflects the fact that the reconstruction angle of $\beta=7.5°$ matches the orientation of the coin in space. However, the xo-zo flat view in FIG. 30D of the cross-sections is almost as thick as FIG. 30B, since the reconstruction angle $\alpha=0$ is selected so that the reconstruction plane still has a relative angle to the coin surface around the xo-axis.

The scanning plane parallel to the base surface of the coin is next chosen so that the features of the relief appear simultaneously in a single tomographic scanning. Specifically, the rotation angles of the reconstruction plane are set to $\alpha=-4°$ and $\beta=7.5°$, as shown in FIG. 27. The reconstructed contour images are shown in FIGS. 29I-L, from which it can be seen that the letters on the coin are now either all highlighted or all darkened, because they are located in the same scanning plane. Similarly, FIG. 30E shows the yo-zo flat view of the reconstruction and FIG. 30F is the xo-zo flat view. Clearly, both of the above two flat views shrink to two thin lines since the scanning planes are now parallel to the coin base surface and the reconstruction angles match well with the actual orientation of the coin.

FIGS. 30A, 30C, and 30E are thus understood as being flats views of the y0-z0 cross-sections from FIGS. 29A-D, 29E-H, and 29I-L, respectively. FIGS. 30B, 30D, and 30F are x0-z0 flats views from FIGS. 29A-D, 29E-H, and 29I-L, respectively.

In the above, rotation angles $\alpha$ and $\beta$ are used to adjust the orientation of the scanning plane. Angle $\gamma$ can also be used to rotate the reconstructed features. FIG. 31A shows several contour images at about 60 μm axial distance intervals with $\alpha=0°$, $\beta=7.5°$ and $\gamma=30°$; and FIG. 31B shows the reconstruction results with $\alpha=-4°$, $\beta=7.5°$ and $\gamma=160°$.

These experiments clearly demonstrate the effectiveness of the disclosed algorithm. The rotation angle $\gamma$ in the algorithm can be any angle within 360°. The Fresnel approximate conditions impose a restriction to the extent of the tilted reconstruction plane, which is related to the tilted angles $\alpha$ or $\beta$. In the case of Eq. (13), the reconstruction plane is tilted only around the x' axis. According to numerical analysis, tilted angle $\alpha$ can be selected as large as 60° and good reconstruction can still be achieved.

As in most 3D microscopy systems, the 3D volume can be reconstructed as a set of scanning planes perpendicular to the optical axis. If the lateral resolution is comparable to the axial resolution, a tilted tomographic image can be obtained by combining or interpolating points from different tomographic layers without too much sacrifice of the image quality. However, if the lateral resolution does not match well with the axial resolution, the quality of the interpolated image will be greatly degraded. For example, if the lateral resolution is much better than the axial resolution, each point on a tilted plane must be interpolated from points of two nearby tomographic layers, and these points are separated with a relatively large axial distance compared to its original lateral resolution. The interpolated point on the tilted plane will therefore lose its accuracy due to the poor axial resolution of the system. As in a WSDIH system, the axial resolution is determined by the wavelength scanning range of the dye laser system and is typically ~10 μm. However, the lateral resolution can be much higher (for example, ~1 μm) if microscopic objectives with high magnification are used in the optical system. Thus a direct interpolation will cause significant degradation to the images in this case.

The use of WSDIH for variable tomographic scanning is based on the advantage of digital holography, that the holograms have recorded all the information of the object. Thus it is possible to directly calculate the more rigorous wavefield distributions on a tilted plane from the recorded holograms. The numerical superposition of these more rigorous tilted fields results in tilted tomographic images, which therefore have better quality than those derived only from interpolation, especially when the lateral resolution does not match well with the axial resolution. Thus the whole process can be fulfilled without physically tilting the object and recording the holograms again, which is a unique capability not provided by the tomographic imaging systems of the prior art.

The novel method introduces some approximate conditions as well, and these approximations are introduced primarily for the fast implementation of the algorithm. To reconstruct the wavefield on tilted planes, it is normally inevitable to introduce a coordinate transform, either in the space domain or in the spectrum domain. However, it is possible to introduce less or no other approximations to the algorithm.

The algorithm for variable tomographic scanning is based on the principle of wavelength scanning digital holography. Object fields are reconstructed in a number of selected tilted planes from a series of holograms and the numerical superposition of the tilted image volumes result in the variable tomographic scanning. In the algorithm, the reconstruction angles are selected as arbitrarily angles in space and not limited in a two-dimensional plane. The algorithm offers more flexibility to observe randomly oriented structures and features of a specimen in a WSDIH system.

Pixel Resolution Control in Numerical Reconstruction of Digital Holography

A novel method for resolution control in numerical reconstruction of digital holography is also disclosed. The wave field on a tilted or vertical plane is reconstructed without being subject to the minimum object-to-hologram distance requirement, and the pixel resolution is easily controlled by adjusting the position of a transitional plane. The novel method solves the problem of pixel resolution control for small object-to-hologram distances and is especially useful for multicolor, multiwavelength digital holography and metrological applications.

It is very important to control the pixel resolution in numerical reconstruction of digital holography (DH) in many applications such as automatic focus and deformation tracking, multicolor DH, wavelength-scanning digital interference holography (WSDIH) for tomographic imaging, or multiwavelength metrology, where the wave field (amplitude or phase maps) at different positions, from different wavelengths, or even from different cameras needs to be compared or combined. The same requirement arises in variable tomographic scanning, where the object field is reconstructed in a number of selected tilted planes from a series of holograms recorded with different wavelengths, and the numerical superposition of all the tilted object fields results in a short coherence length. The Fresnel diffraction formula (FDF) is commonly used in DH. However, its pixel resolution increases in proportion to the reconstruction distance. The Fresnel approximation condition requires an object-to-hologram distance large enough to guarantee precise reconstruction, but the FDF may work well even if the approximation condition is not strictly applied. However, in numerical implementation the FDF is also subject to a minimum object-to-hologram distance limitation (or zmin requirement). Aliasing occurs if the limitation is not met. The zmin requirement must be guaranteed in any case in the FDF, and zmin is the distance at which the reconstructed plane has the same resolution as the hologram. Since it is such an important characteristic for the FDF and its resolution analysis, the zmin requirement is the main concern in this disclosure. The FDF can also be implemented as a convolution, which can be used within the zmin distance. However, the convolution method (CM) does not work if the reconstruction plane is close to the hologram plane. As used herein, CM means the convolution implementation of the FDF; others may define the CM as a form similar to the angular spectrum method (ASM); however, both the CM and the ASM fix the pixel resolution at that of the CCD camera. As mentioned above in the description of the prior art, said prior art includes a zero padding method to control the resolution for the FDF, where the new resolution is decreased by adding more zeros to increase the total pixel number. However, this method cannot be used to adjust the pixel resolution for a distance smaller than zmin. As also mentioned above, the prior art further includes a double-Fresnel-transform method (DFTM) to adjust the reconstruction pixel by introducing a transitional plane (TP) and implementing the FDF twice. The final resolution is proportional to the ratio $|z_2|/|z_1|$, where $|z_2|$ is the distance from the TP to the destination plane (DP) and $|z_1|$ is the distance from the hologram to the TP, with $|z_1|, |z_2| \geq z_{min}$. If the object-to-hologram distance is small, the above ratio can be adjusted only in a limited range. Specifically, the DFTM can not be used for resolution control if the DP is close to the hologram. An alternative approach is disclosed to control the pixel resolution in digital holography. The wave field on either a variable tilted or vertical plane can be reconstructed with adjustable resolution, and the reconstruction distance can be any small distance without being subject to the zmin limitation, which is a unique capability not available in any prior art reconstruction algorithms.

If the reconstruction distance is large enough that the Fresnel approximation condition can be assumed, the wave distribution on a variable tilted x0-y0 plane, with its normal tilted at an angle θ in the y-z plane as in FIG. 32A, can be calculated as:

$$E(x_o, y_o, z_o) = \frac{iE_o}{\lambda} \exp\left[ik\left(r_o + \frac{z_o y_o \sin\theta}{r_o}\right)\right] \times \iint o(x, y) \exp\left[\frac{ik}{2z_o}(x^2 + y^2)\right] \times \exp\left[-\frac{ik}{r_o}(x_o x + y_o y \cos\theta)\right] dx dy, \quad (1)$$

where o(x,y) is the object wave information extracted from the hologram plane at the z=0 plane, k is the wavenumber given by k=2π/λ, E0 is a constant, and r0=(z02+x02+y02)½. In the discrete implementation of Eq. (1), the resolution of the reconstructed plane (x0,y0) is determined as:

$$\Delta x_o = \left|\frac{\lambda z}{N \Delta x}\right|, \quad \Delta y_o = \left|\frac{\lambda z}{N \Delta y \cos\theta}\right|, \quad (2)$$

where Δx0 and Δy0 are the resolutions of the tilted plane, Δx and Δy (equal to Δx) are the resolutions of the hologram plane, and N×N is the array size of a square area on the CCD. Equation (1) is called the tilted Fresnel diffraction formula (TFDF) in this disclosure. Note that if the tilted angle θ is equal to zero, then it becomes the well-known FDF. In particular, aliasing occurs during numerical implementation if $|z| \leq z_{min} = N(\Delta x)^2/\lambda$, which sets the minimum object-to-hologram distance.

However, a small object-to-hologram distance is preferred in some optical systems. For example, a system can be made more compact, or as in a WSDIH system, tomographic images with higher signal-to-noise ratios can be achieved if the object is close to focus. Thus the above algorithm cannot be directly used for reconstruction. To solve this problem, a transitional reconstruction plane (TP) is introduced, and the wave field on the TP is reconstructed by use of the ASM, which has the great advantage of reconstructing wave fields close to the hologram plane, even at distances down to zero. First, the object angular spectrum at the hologram plane, S(kx, ky; 0), is obtained by taking the Fourier transform of the object wave o(x,y; 0), where kx and ky are corresponding spatial frequencies of x and y. The TP is introduced opposite to the DP on the z axis, as shown in FIG. 32B. The angular spectrum of the TP (at z1), S(kx,ky; z1), can be calculated as S(kx,ky; 0) exp(ikzz1), with kz=(k2−kx2−ky2)½. Finally, the complex wave field on the TP, o(x,y; z1), can be calculated from the inverse Fourier transform of S(kx,ky; z1). The resolution of the reconstructed TP is also Δx, the same as that of the hologram plane.

Second, the wave distribution in the tilted (or vertical) DP is reconstructed directly from the TP by use of Eq. (1), and the pixel resolution at the DP is given as:

$$\Delta x_o = \left|\frac{\lambda z_2}{N\Delta x}\right| = \left|\frac{z_2}{z_{\min}}\right|\Delta x, \quad (3)$$
$$\Delta y_o = \frac{\Delta x}{\cos\theta},$$

where $z_2=z_o-z_1$ is the distance from the TP to the center of the DP and $z_{\min}=N(\Delta x)^2/\lambda$ as defined above; thus the pixel resolution can be easily adjusted by selecting a proper $z_1$ for the TP. Note that $z_1$ is normally selected to satisfy $|z_2|\geq z_{\min}$. However the distance from the DP to the hologram, or the original object-to-hologram distance $|z_o|$ can be any small distance without being limited by the minimum distance requirement. Of course, if the original object-to-hologram distance $|z_o|$ is larger than zmin, the TP can also be placed on the positive z axis. Theoretically, the new resolution $\Delta x_o$ can be any value greater than $\Delta x$.

The following experiments verify the effectiveness of the algorithm used in the novel method. FIG. 33 shows an off-axis digital holographic setup based on a Michelson interferometer. The collimated plane wave from a Coherent 699 ring dye laser is focused by lens L1 onto the focal point F1 or F2. Point F2 is also the front focus of objective L2, so the object is illuminated with a collimated beam. Plane S is imaged to the CCD camera by lens L2. In the reference arm the beam is also collimated by lens L3, which results in a magnified image at the CCD camera of an interference pattern that would exist at S if the object wave were superposed with a plane wave there. Aperture AP is placed in the focal plane of L2 to control the size of the object angular spectrum captured in the CCD camera.

In this experiment the system images a surface of a 25 cent coin, containing three letters "IBE" within a 2.5 mm×2.5 mm area of 300×300 pixels; thus the resolution of the hologram is 8.3 μm. The coin is slightly tilted with a small angle $\theta=4°$ to the hologram plane. The wavelength of the dye laser is 580 nm. The reconstruction distance zo, representing the distance from the object to plane S in FIG. 33 is about 0.1 mm. To use FDF for reconstruction, the zmin required for the system is 35.9 mm, which is much larger that the actual zo=0.1 mm in the setup. The reconstruction results of FIGS. 34A and 34B clearly show that neither the FDF nor the CM works in this case. The zero padding method also does not work, because it is based on the FDF and subject to the zmin requirement. A direct reconstruction from the ASM gives a proper result, as shown in FIG. 34C. However, the reconstructed pixel resolution in both directions is fixed as 8.3 μm and cannot be adjusted as in the CM, and the reconstruction planes are all parallel to the hologram plane. For a small object-to-hologram distance as above ($|z_o|<z$, the DFTM can be used for resolution control with a scheme similar to that in FIG. 32B but requires $|z_1|\geq z_{\min}$, and the new resolution is given as $(1+|z_o/z_1|)\Delta x$. Obviously, even if $z_1$ is not at infinity, but if $|z_o|$ is small, the DFTM still cannot be used for resolution control. 34D shows a reconstruction by the DFTM with the TP placed at $z_1=-35.9$ mm; little if any resolution difference can be seen between FIGS. 34D and 34C.

With the algorithm disclosed herein, the pixel resolution can be easily adjusted by changing the position of the TP. For example, if the TP is introduced at $z_1=-53.8$ mm and the rotation angle is set to $\theta=0°$, the reconstructed image is shown as FIG. 34E with $\Delta x_o$, $\Delta y_o$ equal to 12.5 μm. FIG. 34F shows another reconstruction with $\Delta x_o$, $\Delta y_o$ equal to 17.7 μm when $z_1=-71.7$ mm is used. Since either the hologram or the TP is a sampled lattice, nonoverlapping higher-order terms of diffraction may appear in a DP of larger resolution, as shown in FIGS. 34E and 34F. The rectangle in FIGS. 34E and 34F shows the first-order reconstruction, which is of the main interest and can be easily extracted, since its image size is determined by the new resolution and its position can be precisely controlled by the shift of the angular spectrum. Of course, if the conjugate spectrum of the object is not completely filtered out for off-axis holography, a portion of the conjugate image will also appear as a residue in the reconstruction.

A direct application of the proposed algorithm is in WSDIH. For the same object at zo=0.1 mm as above, for example, if the above process is repeated by using eleven (11) different wavelengths from a range of 580.0 to 585.0 nm, and all the reconstructed wave fields are overlapped with the same pixel resolution of 8.3 μm, tomographic images can be achieved with a 60 μm axial resolution. FIG. 35A shows several contour images parallel to the hologram plane, since $\theta=0°$ is used in the algorithm. FIG. 35B shows the contour images when the reconstruction planes are tilted with $\theta=4°$ in reconstruction. It is clearly seen that the letters on the coin are now either all highlighted or all darkened, because they are located in the same scanning plane. Note that since the object distance z0 is so small compared with zmin, it is impossible to use any other available algorithms directly for tilted tomographic reconstruction. However, with the novel algorithm variable tomographic scanning is possible, and the pixel resolution can be easily adjusted.

It has thus been shown that wave fields on a tilted plane or a vertical plane can be reconstructed near the hologram plane without being subject to the minimum object-to-hologram requirement, and the pixel resolution can be easily controlled. The novel algorithm is extremely useful for WSDIH, multi-color holograms, and metrological applications where wave fields of different resolutions need to be compared or combined. It makes pixel resolution control possible, especially when a small object-to-hologram distance is preferred in the system.

This disclosure is also found in the following publications, and each of said publications are incorporated by reference into this disclosure: Variable tomographic scanning with wavelength scanning digital interference holography by Lingfeng Yu and Myung K. Kim, published 2006 in volume 260 Of Optics Communications, pages 462-468, available online at www.sciencedirect.com. Pixel resolution control in numerical reconstruction of digital holography, by the same authors, published 2006, Volume 31, No. 7, Optics Letters beginning at page 897.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for performing variable tomographic scanning in 3D space, comprising the steps of:

calculating wave distributions in a variable tilted plane by employing the Rayleigh-Sommerfeld diffraction integral as:

$$E(x_o, y_o, z_o) = \frac{iE_0}{\lambda} \int\int o(x, y) \frac{\exp[ikr(x, y, x_o, y_o)]}{r(x, y, x_o, y_o)} \times \chi(x, y, x_o, y_o) dx dy \quad (3)$$

where k is the wave number given by $k = 2\pi/\lambda$, $E_0$ is a constant and $\chi(x,y,x_o,y_o)$ is the inclination factor and replacing inverse length $1/r$ by $1/r_o$;

vertically placing a hologram (x-y plane) in the $z = 0$ plane;

tilting the reconstruction plane $x_o$-$y_o$ with its normal direction randomly oriented in space and its origin located at $z = z_p$;

defining frame $x_o$-$y_o$-$z_o$ as a first frame A;

introducing a new plane x'-y' parallel to the hologram plane but sharing the same origin as the $x_o$-$y_o$ plane, thereby defining a second frame B;

transferring any point $[x_o, y_o, z_o]$ on the $x_o$-$y_o$ plane of first frame A to said second frame B as:

$$[x', y', z']^T = {}^B_A R \cdot [x_o, y_o, z_o]^T, \quad (4)$$

where the superscript T represents the vector transpose;

setting $z_0$ to zero for all the points on the $x_o$-$y_o$ plane because the plane is vertical to the $z_0$ axis and it passes through the origin of Frame A; and taking the transform matrix $$\frac{B}{A}$$

R of Frame A relative to Frame B;

$${}^B_A R = \begin{bmatrix} t_{11} & t_{12} & t_{13} \\ t_{21} & t_{22} & t_{23} \\ t_{31} & t_{32} & t_{33} \end{bmatrix}.$$

2. The method of claim 1, further comprising:

obtaining Frame A by rotating Frame B about the x'-axis by an angle $\alpha$, then rotating about y' by an angle $\beta$, and then rotating about z by an angle $\lambda$ so that the total transform matrix $$\frac{B}{A} R$$

is:

$${}^B_A R = R_{z'}(\gamma) R_{y'}(\beta) R_{x'}(\alpha) \quad (6)$$

$$= \begin{bmatrix} \cos\gamma & -\sin\gamma & 0 \\ \sin\gamma & \cos\gamma & 0 \\ 0 & 0 & 1 \end{bmatrix} \begin{bmatrix} \cos\beta & 0 & \sin\beta \\ 0 & 1 & 0 \\ -\sin\beta & 0 & \cos\beta \end{bmatrix} \times$$

$$\begin{bmatrix} 1 & 0 & 0 \\ 0 & \cos\alpha & -\sin\alpha \\ 0 & \sin\alpha & \cos\alpha \end{bmatrix},$$

where $Rxi(\theta)$ represents the transfer matrix of a rotation about an axis $xi$ by an amount of $\theta$.

3. The method of claim 2, further comprising the steps of:

calculating the distance r(x, y, z, xo, yo, zo) between any point (x, y, z) on the hologram plane and a point (xo, yo, zo) on the destination reconstruction plane, expressed in the form of a square root;

expanding said square root as a power series of $r_o = (z_p^2 + x_o^2 + y_{02})^{1/2}$;

discarding all terms in the expanded series except the first two lower order terms so that:

$$r \approx r_o\left(1 + \frac{(x^2 + y^2 - 2xx' - 2yy' + 2zpz')}{2r_o^2}\right), \quad (8)$$

substituting said r into said Rayleigh-Sommerfeld diffraction integral; and substitute x', y' and z' with x and y from Eqs. (4) and (5), so that $$E(\xi, \eta, z_o) = \frac{iE_0}{\lambda r_o} \exp\left[ikr_o + \frac{ik}{r_o}(t_{31}x_o + t_{32}y_o)z_p\right] \times \quad (9)$$

$$\int\int o(x, y) \exp\left[\frac{ik}{2z_o}(x^2 + y^2)\right] \times$$

$$\exp[-i2\pi(\xi x + \eta y)] dx dy,$$

with $$\xi = \frac{(t_{11}x_o + t_{12}y_o)}{\lambda r_o}, \quad (10)$$

$$\eta = \frac{(t_{21}x_o + t_{22}y_o)}{\lambda r_o}. \quad (11)$$

whereby object fields are reconstructed in a number of selected tilted planes from a series of holograms and the numerical superposition of the tilted image volumes result in the variable tomographic scanning;

whereby in the algorithm, the reconstruction angles are selected as arbitrary angles in space and are not limited in a two-dimensional plane, thereby providing more flexibility to observe randomly oriented structures and features of a specimen in a wavelength scanning digital interference system.

4. A method for resolution control in numerical reconstruction of digital holography where a wave field on a tilted or vertical plane is reconstructed without being subject to a minimum object-to-hologram distance requirement, comprising the steps of:

controlling pixel resolution by adjusting the position of a transitional plane;

introducing a transitional reconstruction plane (TP);

reconstructing the wave field on the TP by using the angular spectrum method;

obtaining an object angular spectrum at the hologram plane, S(kx, ky; 0) by taking the Fourier transform of the object wave o(x,y;0), where kx and ky are corresponding spatial frequencies of x and y;

introducing said TP opposite to the DP on the z axis;

calculating the angular spectrum of the TP (at z1), S(kx, ky; z1) as S(kx, ky; 0)exp(ikzz1), with kz =(k2-kx2-ky2)½;

calculating the complex wave field on the TP,o(x,y;zl) from the inverse Fourier transform of S(kx,ky;z1), whereby the resolution of the reconstructed TP is also Δx, the same as that of the hologram plane;

reconstructing the wave distribution in the tilted or vertical DP directly from the TP by use of Eq. (1), so that the pixel resolution at the DP is:

$$\Delta x_o = \left|\frac{\lambda z_2}{N\Delta x}\right| = \left|\frac{z_2}{z_{min}}\right|\Delta x,$$
$$\Delta y_o = \frac{\Delta x}{\cos\theta}, \quad (3)$$

where z2=zo-z1 is the distance from the TP to the center of the DP and zmin= N(Δx)2/λ, whereby the pixel resolution is easily adjusted by selecting a proper z1 for the TP.

5. A method for microscopic three-dimension imaging, comprising the steps of:

taking a plurality of holographic fields with differing wavelengths; and numerically superpositioning said plurality of holographic fields.

6. The method of claim 5, further comprising the steps of:

scanning the wavelength of a laser in a predetermined range in a plurality of step taking the exposure of a hologram at each step of said plurality of steps;

calculating the optical field of a volume around the image location by numerical diffraction from each hologram; and numerically superposing the exposures together by adding the arrays elementwise whereby an accumulated field array of the same size is produced.

7. The method of claim 5, further comprising the steps of:

positioning a beam splitter between a charge-coupled device and an object under observation, said charge-coupled device, said beam splitter, and said object being disposed in axial alignment with one another;

positioning a source of coherent light on a first side of said beam splitter and a mirror on a second side of said beam splitter, said source, said beam splitter, and said mirror being disposed in axial alignment with one another in normal relation to the axial alignment of said charge-couple device, said beam splitter, and said object;

positioning a first lens between said source of coherent light and said beam splitter;

positioning a second lens between said beam splitter and said object; and positioning a third lens between said beam splitter and said mirror.

8. A method for wavelength scanning digital interference holography, comprising the steps of:

providing a variable wavelength source to generate the necessary range of wavelengths of light with sufficient coherence length for holographic imaging;

providing a holographic interferometer and optical system;

providing at least one camera for forming a holographic interference pattern for image acquisition; and providing a dedicated computer system for performing numerical processing and image rendering.

* * * * *